United States Patent
Kwag

(10) Patent No.: US 11,799,159 B2
(45) Date of Patent: Oct. 24, 2023

(54) BATTERY PACK

(71) Applicant: Samsung SDI Co., Ltd., Yongin-si (KR)

(72) Inventor: Nohyun Kwag, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 399 days.

(21) Appl. No.: 16/911,837

(22) Filed: Jun. 25, 2020

(65) Prior Publication Data

US 2021/0074965 A1 Mar. 11, 2021

(30) Foreign Application Priority Data

Sep. 9, 2019 (KR) .................. 10-2019-0111552

(51) Int. Cl.
*H01M 10/6568* (2014.01)
*H01M 50/20* (2021.01)
(Continued)

(52) U.S. Cl.
CPC ....... *H01M 50/20* (2021.01); *H01M 10/6568* (2015.04); *H01M 50/529* (2021.01);
(Continued)

(58) Field of Classification Search
CPC ............ H01M 10/613; H01M 10/643; H01M 10/655; H01M 10/6561; H01M 10/6567;
(Continued)

(56) References Cited

U.S. PATENT DOCUMENTS 6,379,837 B1    4/2002   Takahashi et al.
8,563,154 B2   10/2013   Graban et al.
(Continued)

FOREIGN PATENT DOCUMENTS

CN    101882688 A    11/2010
CN    201741734 U     2/2011
(Continued)

OTHER PUBLICATIONS

EPO Extended European Search Report dated Mar. 15, 2021, issued in corresponding European Patent Application No. 20182249.1 (9 pages).

(Continued)

*Primary Examiner* — Lingwen R Zeng
(74) *Attorney, Agent, or Firm* — Lewis Roca Rothgerber Christie LLP

(57) ABSTRACT

A battery pack includes: battery cells, each including end portions in a height direction thereof; a case accommodating the battery cells and a cooling fluid; and first and second holder plates coupled to the case to face each other along the case such that the end portions of the battery cells are insertable therethrough, an accommodation space being defined between the first and second holder plates to accommodate the cooling fluid, and the case, the battery cells, and the first and second holder plates have heights in the height direction that satisfy the condition: a height between the first and second holder plates <a height of the battery cells <a height of the case, and the battery pack further includes a potting resin on the first and second holder plates.

22 Claims, 18 Drawing Sheets

(51) Int. Cl.
*H01M 50/529* (2021.01)
*H01M 10/6567* (2014.01)
*H01M 10/643* (2014.01)
*H01M 10/655* (2014.01)
*H01M 10/613* (2014.01)
*H01M 10/6561* (2014.01)

(52) U.S. Cl.
CPC ........ *H01M 10/613* (2015.04); *H01M 10/643* (2015.04); *H01M 10/655* (2015.04); *H01M 10/6561* (2015.04); *H01M 10/6567* (2015.04); *H01M 2220/20* (2013.01); *Y02E 60/10* (2013.01); *Y02T 10/70* (2013.01)

(58) Field of Classification Search
CPC ......... H01M 10/6568; H01M 2220/20; H01M 50/20; H01M 50/529; Y02E 60/10; Y02T 10/70
See application file for complete search history.

(56) References Cited

U.S. PATENT DOCUMENTS

| | | | |
|---|---|---|---|
| 9,406,983 | B2 | 8/2016 | Mingers et al. |
| 9,917,290 | B2 | 3/2018 | Cho |
| 10,483,606 | B2 | 11/2019 | Kreisel et al. |
| 2007/0026303 | A1 | 2/2007 | Jeon et al. |
| 2011/0305930 | A1 | 12/2011 | Han |
| 2014/0154545 | A1 | 6/2014 | Kishii et al. |
| 2015/0118530 | A1 | 4/2015 | Lee et al. |
| 2015/0255225 | A1 | 9/2015 | Kusaba et al. |
| 2015/0263317 | A1 | 9/2015 | Gu et al. |
| 2016/0028059 | A1* | 1/2016 | Sweney .............. H01M 50/394 429/87 |
| 2017/0373287 | A1* | 12/2017 | Yamashita ............ H01M 50/35 |
| 2019/0214694 | A1 | 7/2019 | Yang et al. |
| 2020/0044200 | A1 | 2/2020 | Ochs et al. |
| 2020/0112008 | A1 | 4/2020 | Kwag |
| 2020/0220147 | A1* | 7/2020 | Haino ................. H01M 50/514 |
| 2020/0388804 | A1 | 12/2020 | Lee et al. |

FOREIGN PATENT DOCUMENTS

| | | | |
|---|---|---|---|
| CN | 102856406 | A | 1/2013 |
| CN | 104466078 | A | 3/2015 |
| CN | 204441397 | U | 7/2015 |
| CN | 104934558 | A | 9/2015 |
| CN | 103682479 | B | 12/2015 |
| CN | 105118937 | A | 12/2015 |
| CN | 105914319 | A | 8/2016 |
| CN | 206497923 | U | 9/2017 |
| CN | 207021355 | U | 2/2018 |
| CN | 108063200 | A | 5/2018 |
| DE | 10-2015-013377 | A1 | 4/2017 |
| DE | 10 2016 219302 | A1 | 4/2018 |
| DE | 10-2018-003174 | A1 | 10/2018 |
| EP | 2290728 | A1 | 3/2011 |
| EP | 2866295 | A1 | 4/2015 |
| EP | 3651262 | A1 | 5/2020 |
| JP | 2006-156171 | A | 6/2006 |
| JP | 5294575 | B2 | 9/2013 |
| KR | 2014-0037902 | A | 3/2014 |
| KR | 10-2016-0020645 | A | 2/2016 |
| KR | 10-2016-0123851 | A | 10/2016 |

OTHER PUBLICATIONS

EPO Extended Search Report dated Nov. 20, 2020, issued in corresponding European Patent Application No. 20182255.8 (6 pages).
EPO Partial Search Report dated Nov. 20, 2020, issued in European Patent Application No. 20182249.1 (10 pages).
Chinese Office Action for CN Application No. 202010586466.X dated Aug. 24, 2022, 13 pages.
Office Action for U.S. Appl. No. 16/911,844 dated Oct. 27, 2022, 19 pages.
EPO Office Action dated Dec. 8, 2022, issued in corresponding European Patent Application No. 20182255.8 (4 pages).
Chinese Office Action, with English translation, dated Mar. 15, 2023, issued in Chinese Patent Application No. 202010586210.9 (26 pages).
Chinese Office Action, with English translation, dated Apr. 13, 2023, issued in corresponding Chinese Patent Application No. 202010586466.X (27 pages).
U.S. Final Office Action dated May 25, 2023, issued in U.S. Appl. No. 16/911,844 (20 pages).
Chinese Office Action, with English translation, dated Jul. 28, 2023, issued in corresponding Chinese Patent Application No. 202010586466.X (32 pages).

* cited by examiner

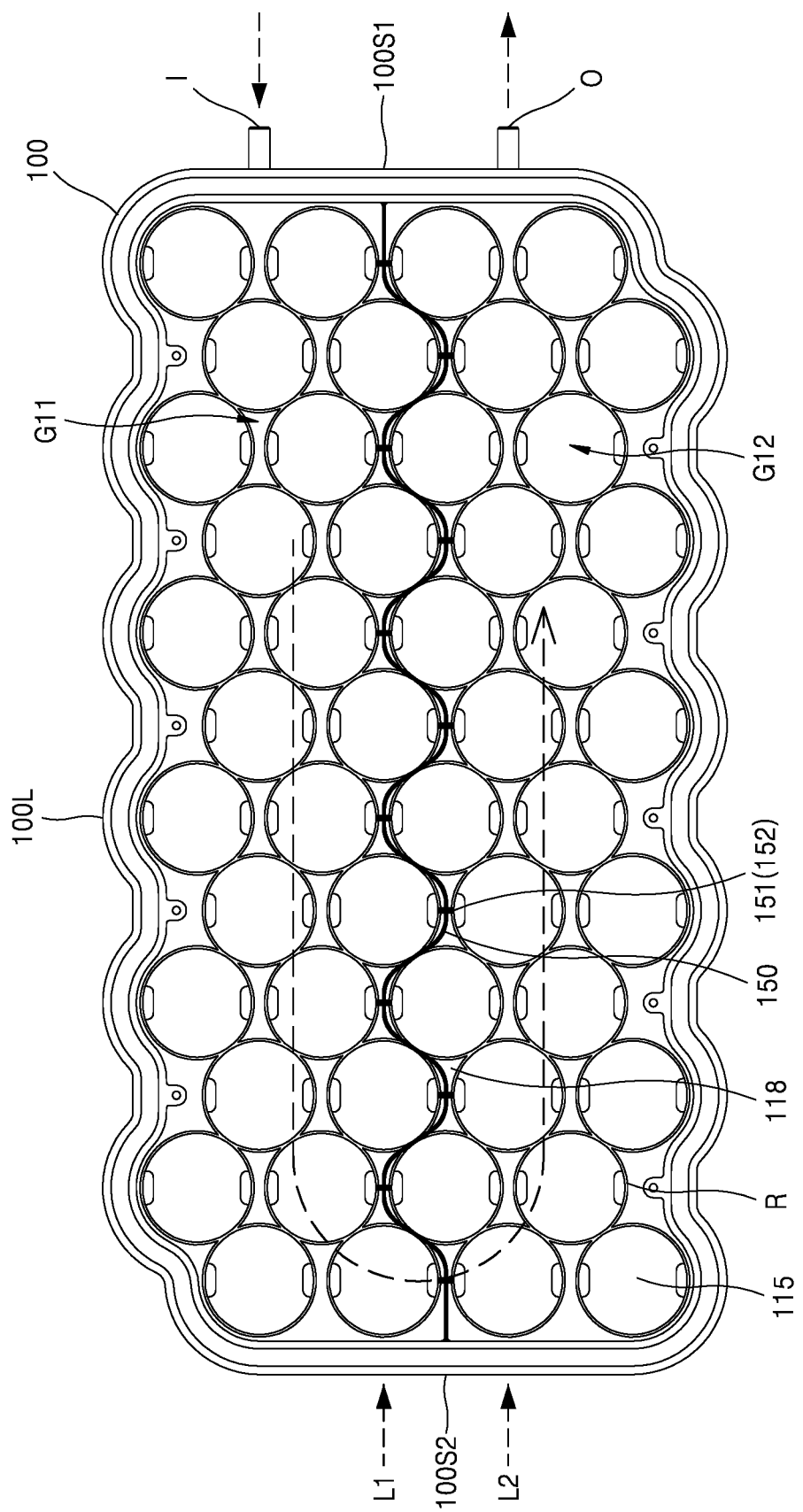

BATTERY PACK

CROSS-REFERENCE TO RELATED APPLICATION

This application claims priority to and the benefit of Korean Patent Application No. 10-2019-0111552, filed on Sep. 9, 2019 in the Korean Intellectual Property Office, the entire disclosure of which is incorporated herein by reference.

BACKGROUND

1. Field

Aspects of one or more embodiments relate to a battery pack.

2. Description of the Related Art

In general, secondary batteries refer to batteries that may be charged and recharged, unlike non-rechargeable primary batteries. Secondary batteries are used as energy sources of devices, such as mobile devices, electric vehicles, hybrid electric vehicles, electric bicycles, and uninterruptible power supplies. Single-cell secondary batteries or multi-cell secondary batteries (secondary battery packs) in which a plurality of battery cells are connected as one unit are used according to the types of external devices that use the secondary batteries.

Small mobile devices, such as cellular phones, may be operated for a certain time (e.g., a predetermined time) using single-cell secondary batteries. However, multi-cell secondary batteries (secondary battery packs) having high-output, high-capacity features may be suitable for devices having long operating times and requiring high power, such as electric vehicles or hybrid electric vehicles consuming large amounts of power. The output voltage or current of a battery pack may be increased by adjusting the number of batteries (battery cells) included in the battery pack.

SUMMARY

According to an aspect of one or more embodiments, a battery pack having an accommodation space in which a flow of a cooling fluid is induced for direct contact with battery cells, thereby improving heat dissipation efficiency, is provided.

According to another aspect of one or more embodiments, a battery pack having a sealing structure for a cooling fluid such that the cooling fluid may not leak from an accommodation space of battery cells is provided.

Additional aspects will be set forth, in part, in the description which follows and, in part, will be apparent from the description, or may be learned by practice of the presented embodiments of the disclosure.

According to one or more embodiments, a battery pack includes: battery cells, each including end portions in a height direction thereof; a case accommodating the battery cells and a cooling fluid to cool the battery cells; and a first holder plate and a second holder plate which are coupled to the case to face each other along the case such that the end portions of the battery cells are insertable through the first and second holder plates, an accommodation space being defined between the first and second holder plates to accommodate the cooling fluid, wherein the case, the battery cells, and the first and second holder plates have heights in the height direction of the battery cells that satisfy the following condition: a height between the first and second holder plates <a height of the battery cells <a height of the case, and the battery pack further includes a potting resin on the first and second holder plates.

In one or more embodiments, the potting resin on the first and second holder plates may have a height in the height direction that satisfies the following condition: the height of the battery cells <the height of the potting resin <the height of the case.

In one or more embodiments, the battery pack may further include a bus bar electrically connecting the battery cells to each other, wherein the potting resin may cover coupling portions between the bus bar and the battery cells.

In one or more embodiments, the bus bar may include a main body extending along neighboring rows of the battery cells, and branches branching from the main body toward the battery cells, and the coupling portions may include welded portions between the branches of the bus bar and the battery cells.

In one or more embodiments, the main body and the branches of the bus bar may have a height difference in the height direction, and the potting resin may cover the branches of the bus bar together with the main body of the bus bar.

In one or more embodiments, the main body and the branches of the bus bar may have a height difference in the height direction, and the main body of the bus bar may be exposed from the potting resin.

In one or more embodiments, the potting resin on the first and second holder plates may have a height in the height direction that satisfies the following condition: the height between the first and second holder plates <the height of the potting resin <the height of the battery cells.

In one or more embodiments, the potting resin may expose vents located at the end portions of the battery cells.

In one or more embodiments, the case may include a hollow member which is open in the height direction to accommodate the battery cells and the cooling fluid.

In one or more embodiments, the case may include: the accommodation space in a center portion thereof; and outer walls and inner walls extending in parallel to each other along edges of the case around the accommodation space.

In one or more embodiments, the battery cells, the outer walls, and the inner walls may have heights that satisfy the following condition: a height of the inner walls <the height of the battery cells <a height of the outer walls.

In one or more embodiments, well spaces may be defined between the outer walls and the inner walls along the edges of the case.

In one or more embodiments, the potting resin on the first and second holder plates may be continuously arranged in the well spaces.

In one or more embodiments, skirt portions may be bent inward from the first and second holder plates toward the well spaces and inserted into the well spaces.

In one or more embodiments, the skirt portions may be bent and extend from the first and second holder plates and surround the inner walls.

In one or more embodiments, assembling protrusions may protrude outward from the first and second holder plates away from the accommodation space and hold the end portions of the battery cells.

In one or more embodiments, the first and second holder plates may include cell holes, and the battery cells may be inserted into the cell holes, and the assembling protrusions may be arranged along rows of the cell holes to hold the end portions of the battery cells neighboring each other in a state in which the assembling protrusions are at positions between the cell holes neighboring each other.

In one or more embodiments, the battery pack may further include a bus bar electrically connecting the battery cells to each other, wherein some of the assembling protrusions may include first assembling protrusions which hold the end portions of the battery cells and do not physically interfere with the bus bar, and others of the assembling protrusions may include second assembling protrusions which hold the end portions of the battery cells and the bus bar.

In one or more embodiments, the first and second assembling protrusions may include first protrusion portions protruding toward the end portions of the battery cells, and the second assembling protrusions may further include second protrusion portions protruding toward the bus bar.

In one or more embodiments, the first protrusion portions may be arranged on opposite sides of the second assembling protrusions, and the second protrusion portions may be arranged on sides of the second assembling protrusions between the opposite sides.

In one or more embodiments, the first and second protrusion portions may have a height difference in the height direction.

In one or more embodiments, cell ribs may protrude inward from the first and second holder plates toward the accommodation space and may surround outer circumferential surfaces of the battery cells.

In one or more embodiments, gaps may be formed between the outer circumferential surfaces of the battery cells and the cell ribs.

BRIEF DESCRIPTION OF THE DRAWINGS

The above and other aspects, features, and advantages of certain embodiments of the disclosure will become more apparent from the following description, taken in conjunction with the accompanying drawings, in which:

FIGS. 15 and 16 are an exploded perspective view and a plan view respectively, which illustrate a partition wall structure of a battery pack according to an embodiment.

DETAILED DESCRIPTION

Figure 1:
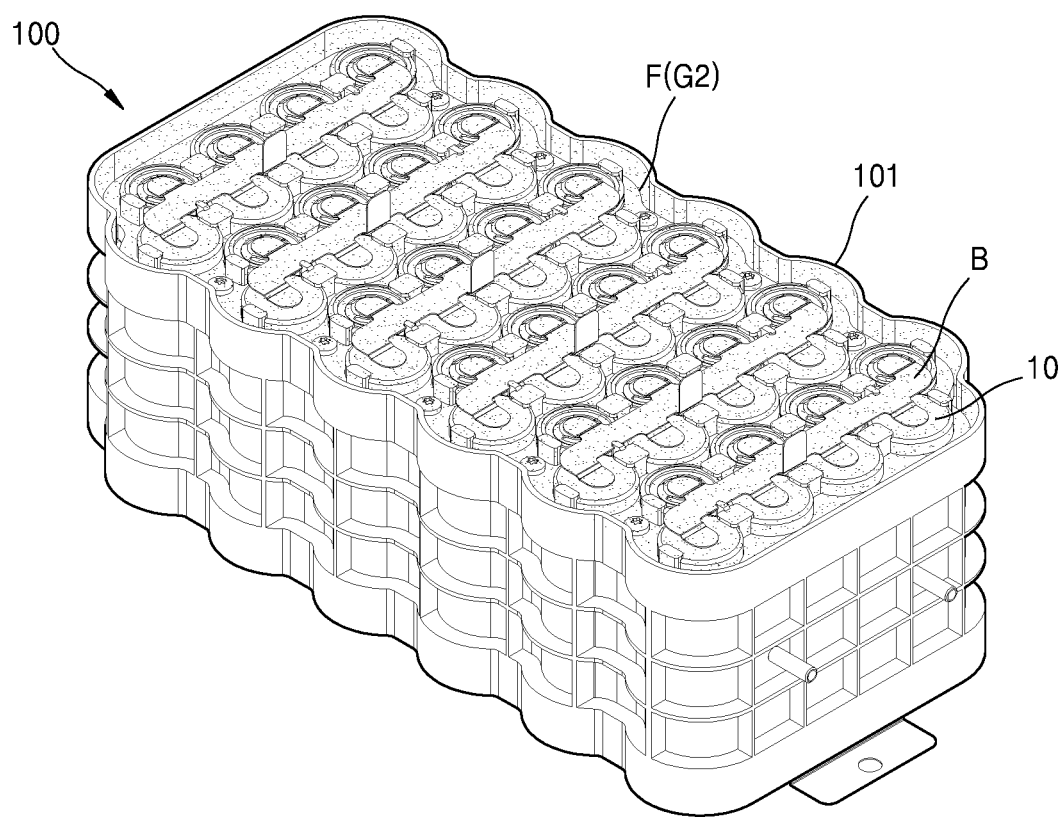
FIG. 1 is a perspective view illustrating a battery pack according to an embodiment.

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are described below, by referring to the figures, to explain aspects of the present description. As used herein, the term "and/or" includes any and all combinations of one or more of the associated listed items. Throughout the disclosure, the expression "at least one of a, b, or c" indicates only a, only b, only c, both a and b, both a and c, both b and c, all of a, b, and c, or variations thereof.

It is to be understood that, although the terms "first," "second," etc. may be used herein to describe various components, these components should not be limited by these terms. These terms are used to distinguish one component from another.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

Sizes of components in the drawings may be exaggerated for convenience of description. In other words, since the sizes and thicknesses of components in the drawings may be arbitrarily illustrated for convenience of description, the following embodiments are not limited thereto.

When a certain embodiment may be implemented differently, a particular process order may be performed differently from the described order. For example, two consecutively described processes may be performed substantially at the same time or performed in an order opposite to the described order.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Battery packs will now be described according to some embodiments with reference to the accompanying drawings.

Figure 2:
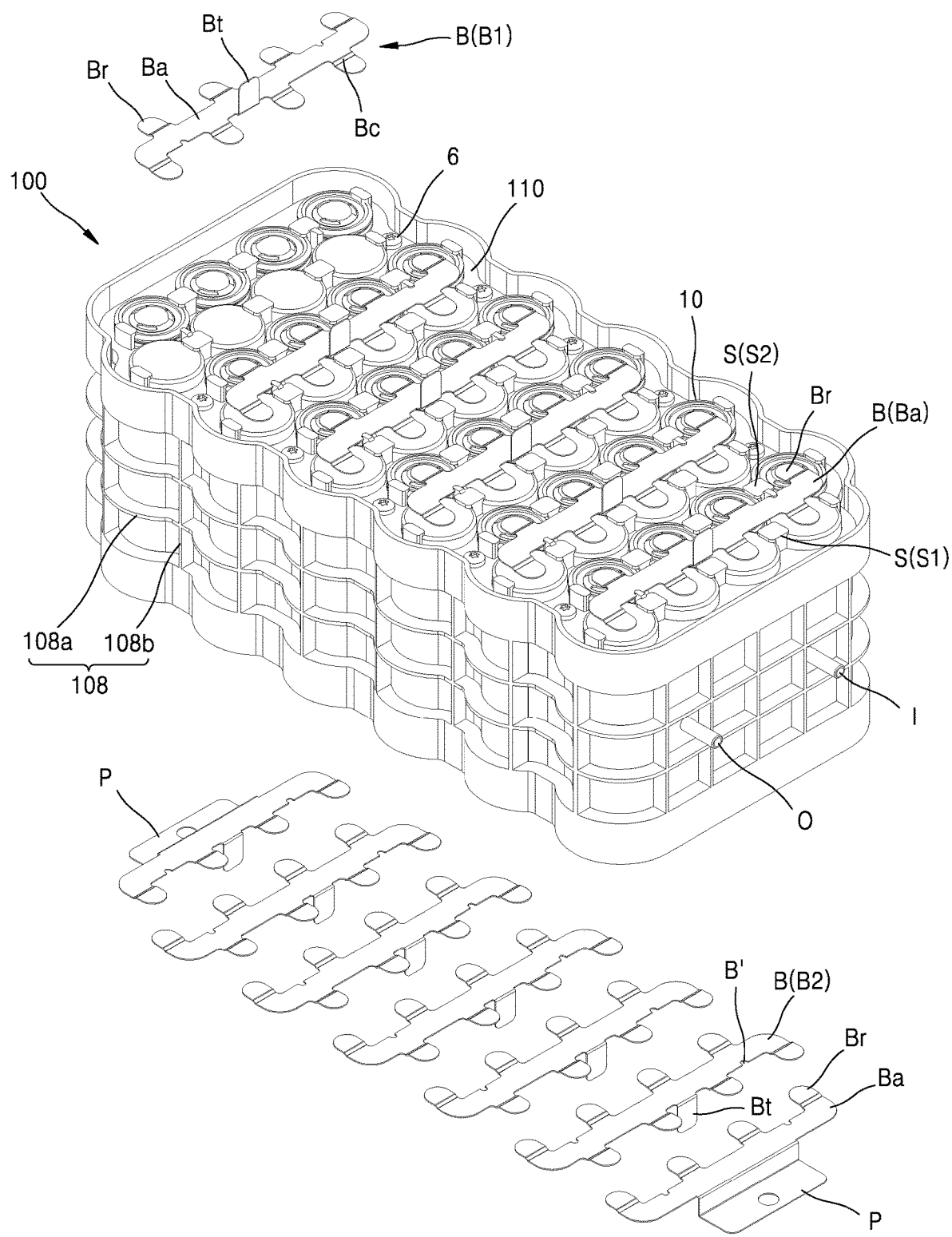
FIGS. 2 and 3 are exploded perspective views illustrating the battery pack shown in FIG. 1.
Figure 3:
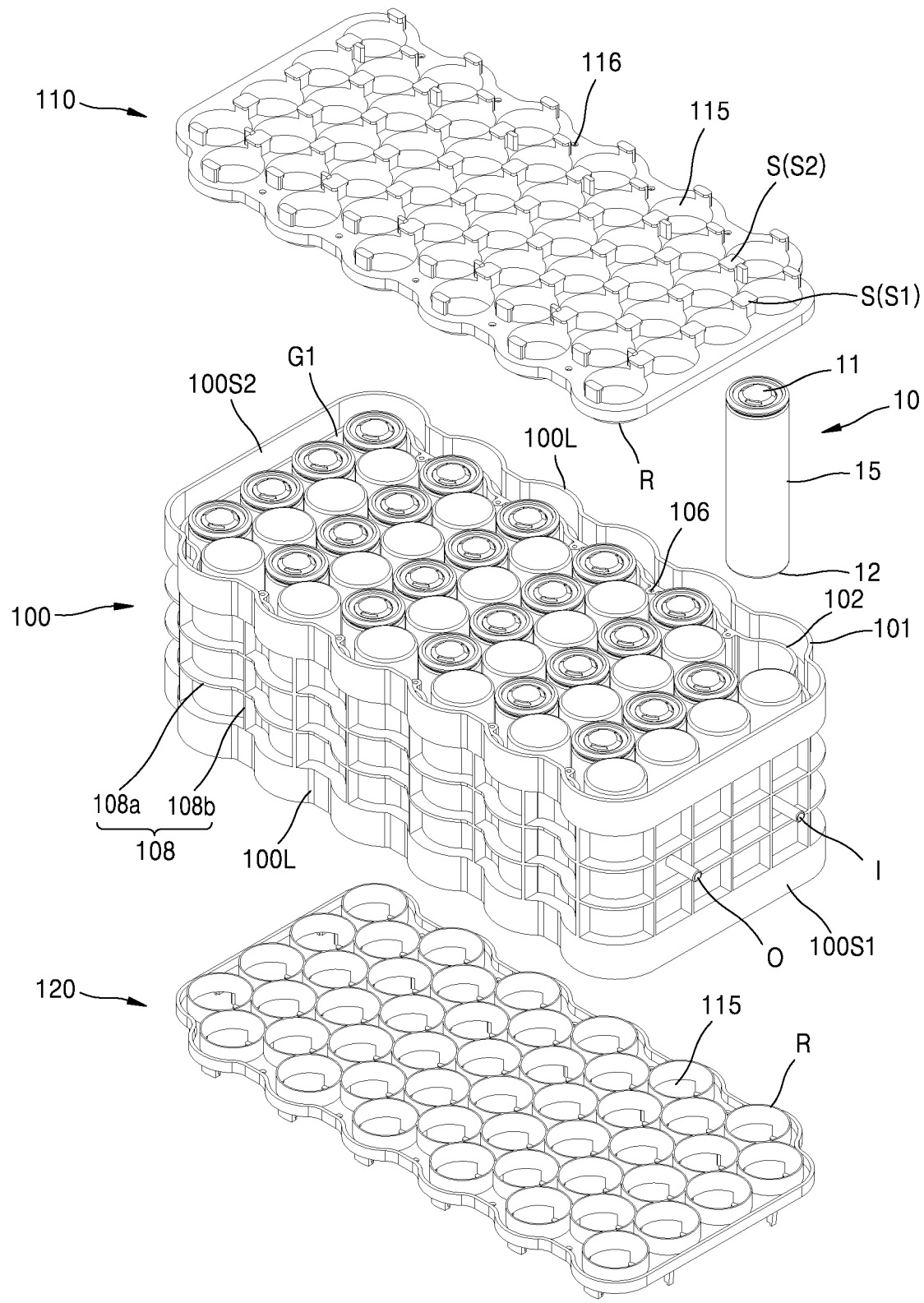
Figure 4:
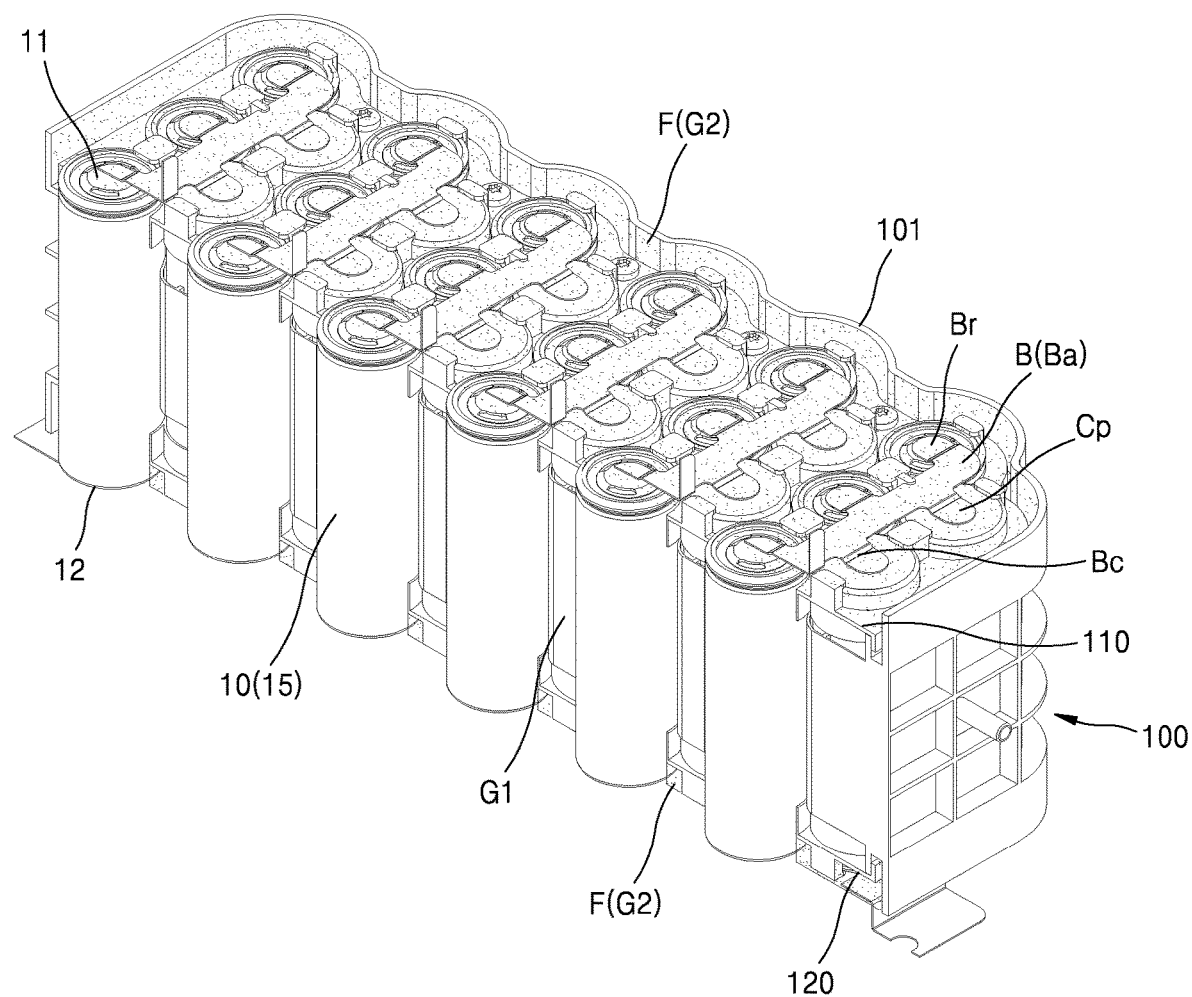
FIG. 4 is a cutaway perspective view illustrating the battery pack shown in FIG. 1.
Figure 5A:
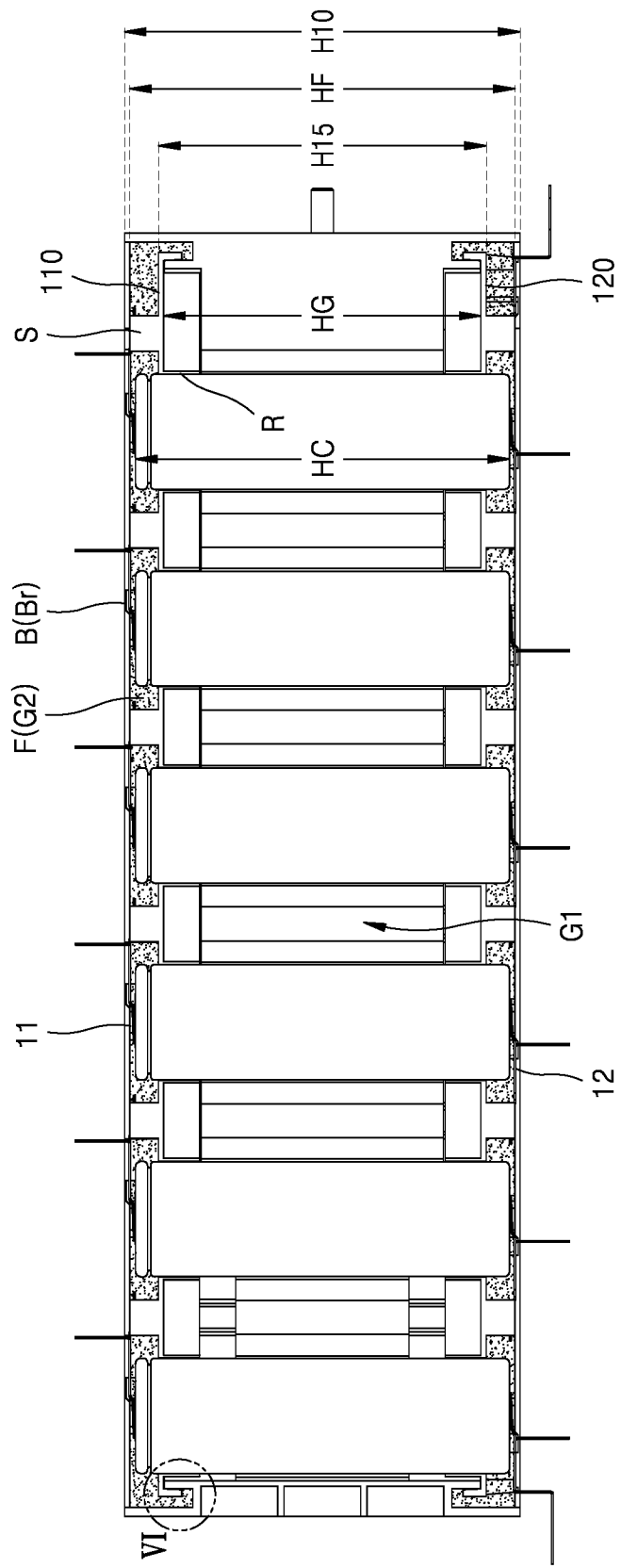
FIGS. 5A and 5B are a cross-sectional view illustrating the battery pack shown in FIG. 4, and an enlarged cross-sectional view illustrating a portion of the battery pack shown in FIG. 5A, respectively.
Figure 5B:
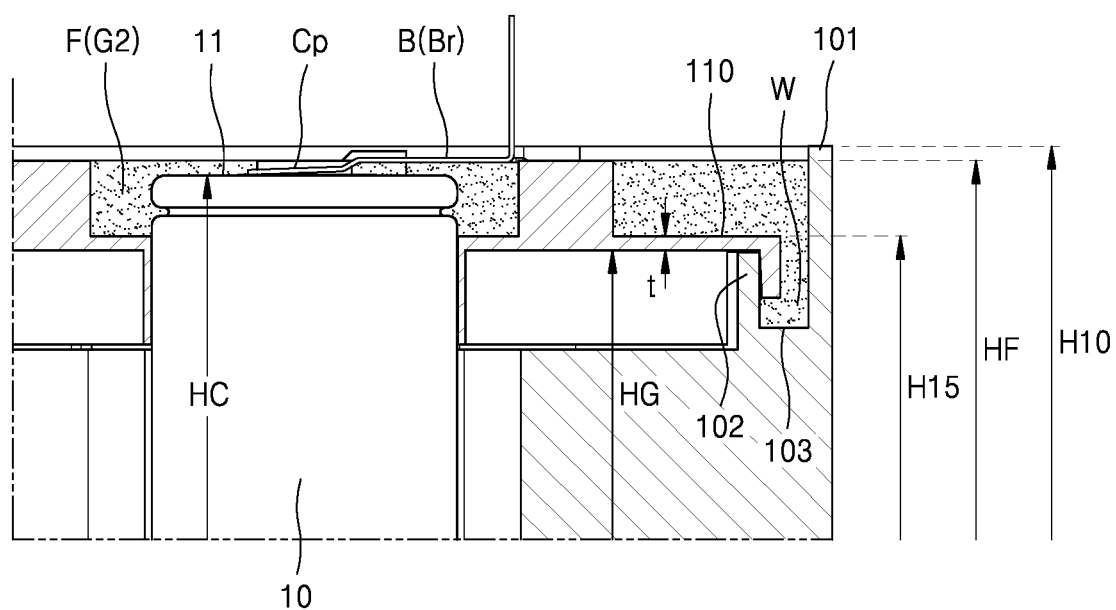
Figure 6:
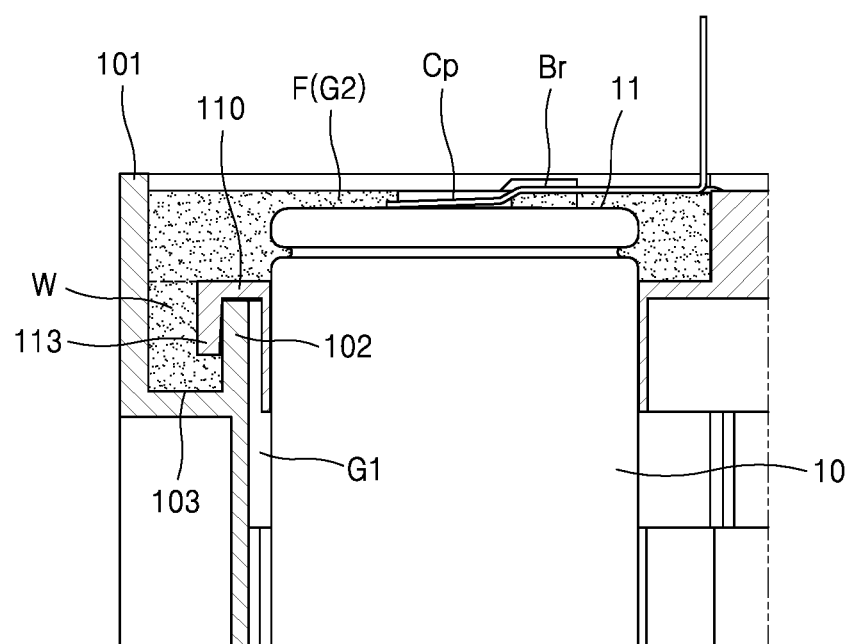
FIG. 6 is an enlarged cross-sectional view illustrating a region VI in FIG. 5A.

FIG. 1 is a perspective view illustrating a battery pack according to an embodiment; FIGS. 2 and 3 are exploded perspective views illustrating the battery pack shown in FIG. 1; FIG. 4 is a cutaway perspective view illustrating the battery pack shown in FIG. 1; FIGS. 5A and 5B are a cross-sectional view illustrating the battery pack shown in FIG. 4, and an enlarged cross-sectional view illustrating a portion of the battery pack shown in FIG. 5A, respectively; and FIG. 6 is an enlarged cross-sectional view illustrating a region VI in FIG. 5A.

Referring to FIG. 1, the battery pack of the present embodiment may include a plurality of battery cells 10 accommodated in a case 100, and a potting resin F filled in filling spaces G2 of the case 100. The potting resin F will be further described later.

Referring to FIGS. 2 and 3 together, the battery pack of the present embodiment may include: the battery cells 10; the case 100 accommodating the battery cells 10 and a cooling fluid for cooling the battery cells 10; and first and second holder plates 110 and 120 assembled to the case 100 to face each other along the case 100 such that first and second end portions 11 and 12 of the battery cells 10 may be inserted through the first and second holder plates 110 and 120, and an accommodation space G1 (refer to FIG. 3) for containing the cooling fluid therein may be formed between the first and second holder plates 110 and 120.

In an embodiment, each of the battery cells 10 may be a cylinder-type battery cell which has a first end portion 11 and a second end portion 12 in the height direction thereof, and a cylindrical outer circumferential surface 15 between the first and second end portions 11 and 12. In the present specification, the height direction may refer to the length direction of the battery cells 10 in which each of the battery cells 10 has the longest dimension. For example, in the present specification, the height direction of the case 100 may be the same as the height direction of the battery cells 10.

In an embodiment, the first and second end portions 11 and 12, which are opposite each other in the height direction of the battery cells 10, may correspond to electrodes which have different polarities and through which charge or discharge current is input or output. For example, the first and second end portions 11 and 12 may respectively include upper electrodes and lower electrodes of the battery cells 10 in the height direction. In this case, the first and second end portions 11 and 12 are defined according to upper and lower positions in the height direction rather than according to polarities, that is, positive and negative polarities. Thus, some of the first end portions 11 of the battery cells 10 may have a positive polarity, and the others of the first end portions 11 of the battery cells 10 may have a negative polarity. Similarly, some of the second end portions 12 of the battery cells 10 may have a positive polarity, and the others of the second end portions 12 of the battery cells 10 may have a negative polarity. For example, the battery cells 10 may be overturned relative to each other in the height direction such that the polarities of the first and second end portions 11 and 12 of the battery cells 10 in two neighboring rows may be reversed. That is, the first and second end portions 11 and 12 may have different polarities in this manner, and, as described later, the first and second end portions 11 and 12 of the battery cells 10 in two neighboring rows may be electrically connected to each other using bus bars B (refer to FIG. 2) to connect different polarities of the battery cells 10 in series in the two neighboring rows. In this case, the first and second end portions 11 and 12 of the battery cells 10 in the same row may be connected in parallel by connecting end portions having the same polarity through bus bars B, and the first and second end portions 11 and 12 of battery cells 10 in neighboring rows may be connected in series by connecting end portions having different polarities through bus bars B.

In another embodiment, electrodes having different polarities through which charge and discharge current is input or output may be formed on end portions selected from the first and second end portions 11 and 12, which are opposite in the height direction of the battery cells 10, and, in this case, different portions of the selected end portions may have positive and negative polarities. Further, in other embodiments, the battery cells 10 may be of any type, including a prismatic type, without being limited to a cylinder type. In an embodiment, the battery pack may be mounted on a moving unit, such as a vehicle, to provide power to the moving unit, and, in this case, the battery pack may include a large-capacity battery cell 10 or a plurality of large-capacity battery cells 10 to provide required output performance.

Referring to FIG. 2, the battery cells 10 of the battery pack may be electrically connected to each other through bus bars B. In an embodiment, the bus bars B may include a plurality of bus bars B, each electrically connecting two neighboring rows of battery cells 10. For example, the bus bars B may include first bus bars B1, each connected to the first end portions 11 of battery cells 10 included in two neighboring rows, and second bus bars B2, each connected to the second end portions 12 of battery cells 10 in the two neighboring rows. The first and second bus bars B1 and B2 may be arranged at upper and lower opposite positions in the height direction of the battery cells 10 so as to be respectively connected to the first and second end portions 11 and 12 of the battery cells 10.

Each of the bus bars B may include a main body Ba which extends in the direction of rows of the battery cells 10, and a plurality of branches Br which branch off from the main body Ba toward the first and second end portions 11 and 12 of the battery cells 10. In an embodiment, a bus bar B may electrically connect two neighboring rows of battery cells 10, and, in this case, the main body Ba may extend along the two neighboring rows of battery cells 10, and the branches Br may protrude toward the first and second end portions 11 and 12 from intermittent positions of the main body Ba. The main body Ba may have both ends on the outermost branches Br and may extend between the outermost branches Br, and may be fixed by assembling protrusions S (corresponding to second assembling protrusions S2), as described later.

Referring to FIG. 2, a measurement terminal Bt for outputting voltage information of battery cells 10 may be formed on the main body Ba of a bus bar B, and, according to an embodiment, the measurement terminal Bt may protrude outward from the main body Ba of each bus bar B. Output terminals P may be formed on some of the bus bars B such that charge and discharge currents may be input or output through the output terminals P, and, according to an embodiment, the output terminals P may be formed on the outermost second bus bars B2, which are arranged at outermost positions among second bus bars B2.

Referring to FIG. 3, the case 100 may be formed as a hollow member which is open in the height direction to accommodate the battery cells 10 and the cooling fluid for cooling the battery cells 10. For example, the accommodation space G1 for accommodating the battery cells 10 and the cooling fluid for cooling the battery cells 10 may be formed in a center portion of the case 100, and inner walls 102 for assembling the first and second holder plates 110 and 120 and outer walls 101 for confining the potting resin F (refer to FIG. 1) may be formed along edges of the case 100 which surround the accommodation space G1 formed in the center portion of the case 100. The inner walls 102 and the outer walls 101 may extend side by side along the edges of the case 100. The inner walls 102 and the outer walls 101 are connected to each other through bottom surfaces 103 provided therebetween and may have different heights from the bottom surfaces 103. The inner walls 102 and the outer walls 101 of the case 100 may form well spaces W (refer to FIGS. 5A and 5B) therebetween, and the well spaces W will be further described later.

The case 100 may provide rigidity to the battery pack and may protect the battery cells 10 accommodated therein from the outside. For example, in some embodiments, the battery pack may be attached to a moving unit, such as a vehicle, and may have a certain degree of strength in a case of collision of the moving unit. In an embodiment, the case 100 may include a ductile metal material that has strength and ductility so as not to be fractured or broken, even when the case 100 is externally impacted. For example, if the case 100 includes a brittle material, such as a plastic or synthetic resin, the case 100 may fracture or break due to impacts with external objects, and, thus, in an embodiment, the case 100 may include a metal material, such as aluminum. In addition, the case 100 may function as a heat sink for the battery cells 10 accommodated therein and the cooling fluid for cooling the battery cells 10 and may thus include a metal material, such as aluminum, having high thermal conductivity. In an embodiment, as described further later, a plurality of reinforcing ribs 108 (refer to FIG. 3) is formed along an outer side of the case 100 to supplement the structural rigidity of the case 100 and increase the heat dissipation area of the case 100.

In an embodiment, the case 100 may be formed in a substantially rectangular parallelepiped shape including a pair of long side portions 100L and first and second short side portions 100S1 and 100S2 connecting the pair of long side portions 100L to each other, and the case 100 may also be formed in a serpentine shape along outer circumferential surfaces 15 of the battery cells 10, which are arranged along the edges of the case 100. In this case, since the surface area of the case 100 having a serpentine shape increases, heat dissipation may be facilitated, and the case 100 may absorb external shocks while the case 100 deforms more flexibly according to external shocks. In an embodiment, the serpentine shape of the case 100 may be formed along the long side portions 100L of the case 100, and the first and second short side portions 100S1 and 100S2 of the case 100 may be flat. An inlet I and an outlet O may be formed in the first short side portion 100S1 to allow the cooling fluid to flow into and out of the case 100, and, in an embodiment, the first short side portion 100S1 may be formed in a flat shape for a secure fluidic connection of an opposing part to the inlet I and the outlet O. In an embodiment, the second short side portion 100S2, which is opposite the first short side portion 100S1, may be formed in a flat shape to provide a reference mounting or assembling plane when the battery pack is mounted on a device, such as a vehicle, and to stably align the mounting position of the battery pack in such a device without shaking. The reinforcing ribs 108 (refer to FIG. 3) may be formed along the outer side of the case 100 to reinforce the strength of the case 100. In an embodiment, for example, the reinforcing ribs 108 may include a plurality of first reinforcing ribs 108a extending in parallel with each other at different heights in the height direction of the case 100, and a plurality of second reinforcing ribs 108b extending across the first reinforcing ribs 108a along the height direction of the case 100. The reinforcing ribs 108 may reinforce the strength of the case 100 and increase the surface area of the case 100 to provide a larger heat dissipation area.

Referring to FIG. 3, the first and second holder plates 110 and 120 may be assembled to the case 100 to face each other along the case 100 such that the first and second end portions 11 and 12 of the battery cells 10 may be inserted through the first and second holder plates 110 and 120, and the accommodation space G1 accommodating the cooling fluid may be formed between the first and second holder plates 110 and 120. A plurality of cell holes 115 into which the battery cells 10 are inserted may be formed in the first and second holder plates 110 and 120. In addition, the first and second holder plates 110 and 120 may include: cell ribs R protruding inward from the first and second holder plates 110 and 120 to surround the outer circumferential surfaces 15 of the battery cells 10; and assembling protrusions S protruding outward from the first and second holder plates 110 and 120 to hold the first and second end portions 11 and 12 of the battery cells 10. The cell holes 115, the cell ribs R, and the assembling protrusions S formed on the first and second holder plates 110 and 120 will be further described later.

Together with the case 100, the first and second holder plates 110 and 120 may form the accommodation space G1 which accommodates the cooling fluid for cooling the battery cells 10. The first and second holder plates 110 and 120 may include inner surfaces which face the accommodation space G1 of the cooling fluid, and outer surfaces which are opposite the inner surfaces, and as described below, the potting resin F (refer to FIG. 1) may be formed on the outer surfaces of the first and second holder plates 110 and 120 to heights (e.g., predetermined heights) to seal the accommodation space G1 of the cooling fluid.

In the present specification, the cooling fluid may refer to a liquid cooling medium having a relatively high thermal capacity and thus a relatively high cooling ability compared to a gaseous cooling medium, such as air, and may include any of an electrically insulative cooling fluid and an electrically conductive cooling fluid. However, the technical scope of the present disclosure is not limited thereto, and, in other embodiments, the cooling fluid may include a gaseous cooling medium, for example, a gaseous cooling medium such as a refrigerant gas. In this case, the cooling fluid including a gaseous cooling medium may be accommodated in the accommodation space G1 between the first and second holder plates 110 and 120, and the cooling fluid accommodated in the accommodation space G1 may be sealed by the potting resin F (refer to FIG. 1) formed on the outer surfaces of the second holder plates 110 and 120.

Referring to FIGS. 4, 5A, and 5B, the potting resin F may be filled over the first and second holder plates 110 and 120. The potting resin F filled over the first and second holder plates 110 and 120 may securely seal the accommodation space G1 of the cooling fluid formed between the first and second holder plates 110 and 120. In an embodiment, the potting resin F may include a silicone material having good sealing properties. However, the potting resin F of the present disclosure is not limited thereto and may include any other suitable material. The potting resin F may be surrounded by the outer walls 101 forming the edges of the case 100, such that the potting resin F may be formed on the first and second holder plates 110 and 120 to a certain height without overflow to the outside. That is, the outer walls 101 of the case 100 may define the filling spaces G2 for the potting resin F. Since the potting resin F is formed on the first and second holder plates 110 and 120, a height HF (refer to FIGS. 5A and 5B) of the potting resin F may be greater than at least a height H15 between the first and second holder plates 110 and 120. Here, the height HF of the potting resin F is a height from a portion of the potting resin F formed on the first holder plate 110 to a portion of the potting resin F formed on the second holder plate 120, that is, a height between the portions of the potting resin F formed on the first and second holder plates 110 and 120. In other words, the height HF of the potting resin F does not refer to only the thicknesses of layers of the potting resin F formed on the first and second holder plates 110 and 120, but may refer to the sum of the thicknesses of the layers of the potting resin F formed on the first and second holder plates 110 and 120, thicknesses t of the first and second holder plates 110 and 120, and a height HG of the accommodation space G1 formed between the first and second holder plates 110 and 120.

Similarly, the height H15 between the first and second holder plates 110 and 120 may refer to a height obtained by adding the thicknesses t of the first and second holder plates 110 and 120 to the height HG of the accommodation space G1 formed between the first and second holder plates 110 and 120. That is, the height H15 between the first and second holder plates 110 and 120 may refer to a height measured between the first and second holder plates 110 and 120 without including the assembling protrusions S protruding in outward directions from the first and second holder plates 110 and 120 or the cell ribs R protruding in inward directions from the first and second holder plates 110 and 120, and, thus, the thicknesses t of the first and second holder plates 110 and 120 may be included in the height H15, but the heights of the assembling protrusions S or the cell ribs R may not be included in the height H15.

In an embodiment, the cooling fluid for cooling the battery cells 10 may be securely contained in the accommodation space G1 between the first and second holder plates 110 and 120, and the potting resin F may be filled over the first and second holder plates 110 and 120 to prevent or substantially prevent leakage of the cooling fluid. In this case, the height H10 of the case 100 (for example, the height of the outer walls 101) may function as a dam, such that the potting resin F may be formed on the first and second holder plates 110 and 120 to a certain height (e.g., a predetermined height) without overflow to the outside. Therefore, the height HF of the potting resin F may be lower than the height H10 of the case 100. As a result, the height HF of the potting resin F may be greater than the height H15 between the first and second holder plates 110 and 120 on which the potting resin F is formed, but may be less than the height H10 of the case 100 functioning as a dam for the potting resin F, that is, the heights HF, H15, and H10 may satisfy the condition, H15<HF<H10.

In an embodiment, the potting resin F may be formed to a height at which the first and second end portions 11 and 12 of the battery cells 10 are completely covered with the potting resin F. In this case, the height HF of the potting resin F may be greater than a height HC of the battery cells 10, that is, HF>HC. For example, the potting resin F may cover the first and second end portions 11 and 12 of the battery cells 10, and coupling portions Cp between the first and second end portions 11 and 12 of the battery cells 10 and the bus bars B (for example, the branches Br of the bus bars B). In an embodiment, the coupling portions Cp may include welded portions between the first and second end portions 11 and 12 of the battery cells 10 and the branches Br of the bus bars B. In this manner, since the potting resin F covers the coupling portions Cp between the first and second end portions 11 and 12 of the battery cells 10 and the bus bars B (for example, the branches Br of the bus bars B), the coupling portions Cp may be protected from harmful environmental factors which may cause corrosion, oxidation, or galvanic corrosion of the coupling portions Cp. In an embodiment, the height HF of the potting resin F may be greater than the height HC of the battery cells 10, but less than the height H10 of the case 100 functioning as a dam for the potting resin F, that is, HC<HF<H10.

Referring to FIG. 4, in an embodiment, the potting resin F may cover the coupling portions Cp between the first and second end portions 11 and 12 of the battery cells 10 and the branches Br of the bus bars B, and the branches Br and the main bodies Ba of the bus bars B as well. Although not shown, in another embodiment, the potting resin F may cover the coupling portions Cp between the first and second end portions 11 and 12 of the battery cells 10 and the branches Br of the bus bars B, but may not cover the main bodies Ba of the bus bars B. In an embodiment, the main bodies Ba of the bus bars B may have a height difference in an outward (for example, upward) direction from the first and second end portions 11 and 12 of the battery cells 10 because the branches Br are bent in a stepped shape in inward (for example, downward) directions from the main bodies Ba (at bent portions Bc) and connected to the first and second end portions 11 and 12 of the battery cells 10. In this case, the potting resin F may cover the coupling portions Cp between the battery cells 10 and the branches Br for protection thereof, but may not cover the main bodies Ba of the bus bars B, such that a lesser amount of the potting resin F may be used.

Referring to FIGS. 5A and 5B, since the outer walls 101 of the case 100 define the filling spaces G2 in which the potting resin F is filled and serve as a dam for containing the potting resin F, the height of the outer walls 101 (for example, the height H10 of the case 100) may be greater than the height of the inner walls 102. The outer walls 101 and the inner walls 102 may be connected through the bottom surfaces 103 formed between the outer walls 101 and the inner walls 102, and may protrude to different heights from the bottom surfaces 103. Since the inner walls 102 form the well spaces W connected to the filling spaces G2, the height of the inner walls 102 may be less than the height of the outer wall 101.

In an embodiment, the height HC of the battery cells 10 may be greater than the height of the inner walls 102 but less than the height of the outer walls 101. The inner walls 102 may regulate the height H15 between the first and second holder plates 110 and 120, and the heights of the first and second holder plates 110 and 120 may be determined as the first and second holder plates 110 and 120 are brought into contact with the inner walls 102. Here, the first and second end portions 11 and 12 of the battery cells 10 may be away from the first and second holder plates 110 and 120 and may be exposed from the accommodation space G1 of the cooling fluid, and, to this end, the height H15 between the first and second holder plates 110 and 120 may be less than the height HC of the battery cells 10. In an embodiment, the height of the inner walls 102 regulating the height H15 between the first and second holder plates 110 and 120 may also be less than the height HC of the battery cells 10. In addition, the height H10 of the case 100, that is, the height of the outer walls 101, may be greater than at least the height HC of the battery cells 10, such that the battery cells 10 may be completely accommodated in the case 100. As described above, the potting resin F may be filled over the first and second holder plates 110 and 120 to a height at which the first and second end portions 11 and 12 of the battery cells 10 exposed through the first and second holder plates 110 and 120 are covered with the potting resin F, and, thus, the height H10 of the case 100, that is, the height of the outer walls 101 functioning as a dam for containing the potting resin F may be greater than at least the height HC of the battery cells 10, such that the outer walls 101 may have an additional height remaining even after covering the potting resin F.

Referring to FIG. 6, the well spaces W may be formed along the edges of the case 100 to hermetically seal the accommodation space G1 of the cooling fluid. As described above, the potting resin F may be formed on the first and second holder plates 110 and 120 to hermetically seal the accommodation space G1 of the cooling fluid which is formed between the first and second holder plates 110 and 120. In an embodiment, the potting resin F may fill the filling spaces G2 above the first and second holder plates 110 and 120 and also the well spaces W formed along the edges of the case 100, thereby preventing or substantially preventing leakage of the cooling fluid through the edges of the case 100.

In an embodiment, the well spaces W may include concave spaces defined by the outer walls 101 and the inner walls 102 of the case 100, and the bottom surfaces 103 connecting the outer walls 101 and the inner walls 102 to each other. For example, the well spaces W may be defined by the inner walls 102 and skirt portions 113 of the first and second holder plates 110 and 120 surrounding the inner walls 102, and may include spaces between the inner walls 102 and the outer walls 101 and spaces between the outer walls 101 and the skirt portions 113 surrounding the inner walls 102. The skirt portions 113 will be further described later.

The well spaces W may be connected to the filling spaces G2 formed on the first and second holder plates 110 and 120 such that all the well spaces W and the filling spaces G2 may be filled with the potting resin F. In an embodiment, for example, the potting resin F may be continuously formed in the well spaces W and the filling spaces G2 without disconnection or separation. The well spaces W and the filling spaces G2 may be connected to each other in a stepped manner in the width direction thereof. For example, the well spaces W, which have a relatively small width between the outer walls 101 and the inner walls 102, may be connected to the filling spaces G2, which have a relatively large width and are surrounded by the outer walls 101 at a height away from the inner walls 102, in a stepped manner in the width direction thereof.

The boundaries defining the well spaces W may be bypassing boundaries which bend along the inner walls 102, the bottom surfaces 103, and the outer walls 101, and due to the well spaces W (or the potting resin F filled in the well spaces W) having the bypassing boundaries in a bent shape, leakage of the cooling fluid contained in the accommodation space G1 may be effectively prevented. For example, to prevent or substantially prevent the cooling fluid from leaking from the accommodation space G1 along the boundaries of the well spaces W (or the potting resin F filled in the well spaces W), the boundaries of the well spaces (or the potting resin F filled in the well spaces W) are formed as bypassing boundaries having a bent shape to increase a path through which the cooling fluid flows and effectively prevent leakage of the cooling fluid.

Figure 7:
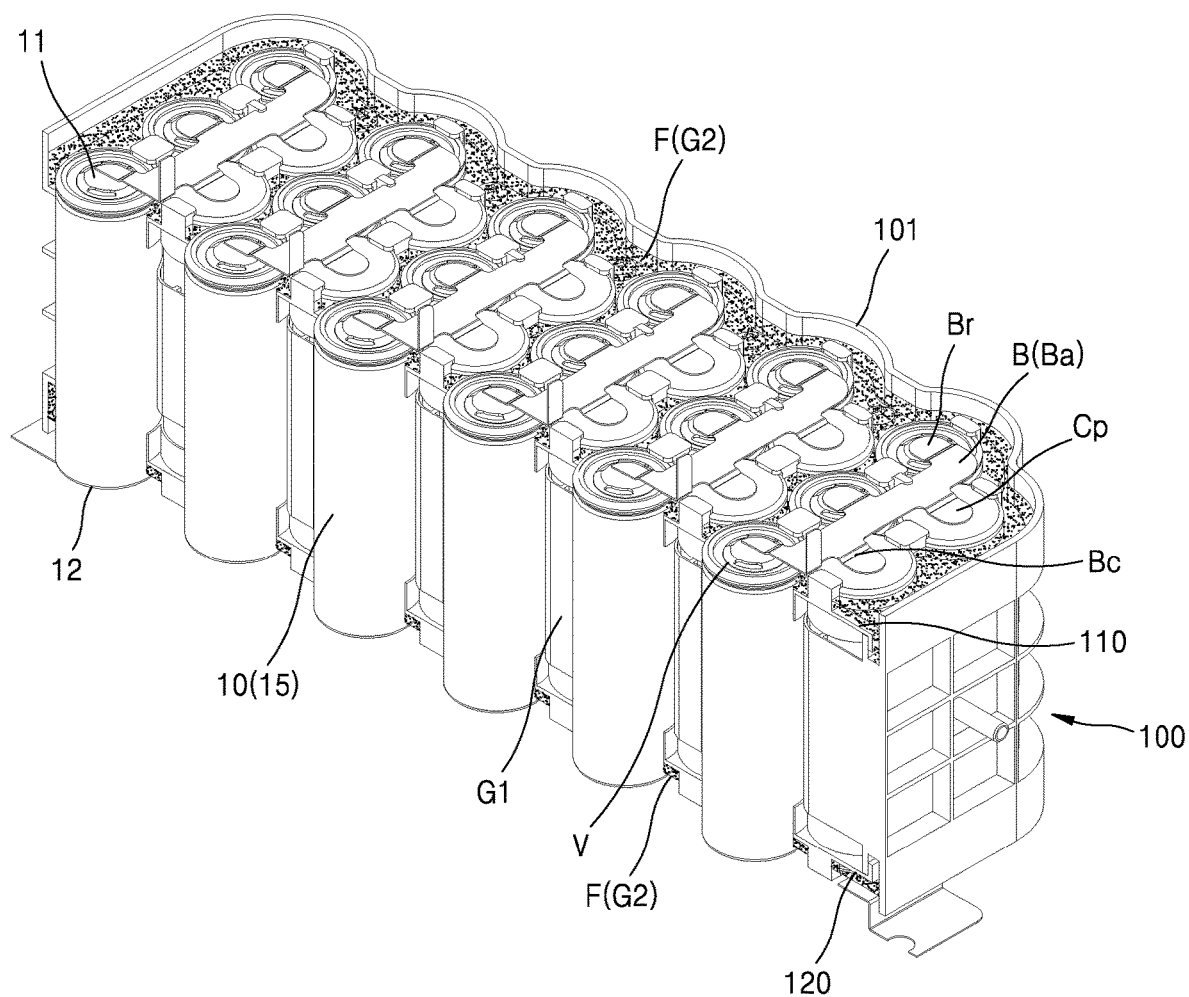
FIG. 7 is a cutaway perspective view illustrating filling of a potting resin in a battery pack according to an embodiment.
Figure 8A:
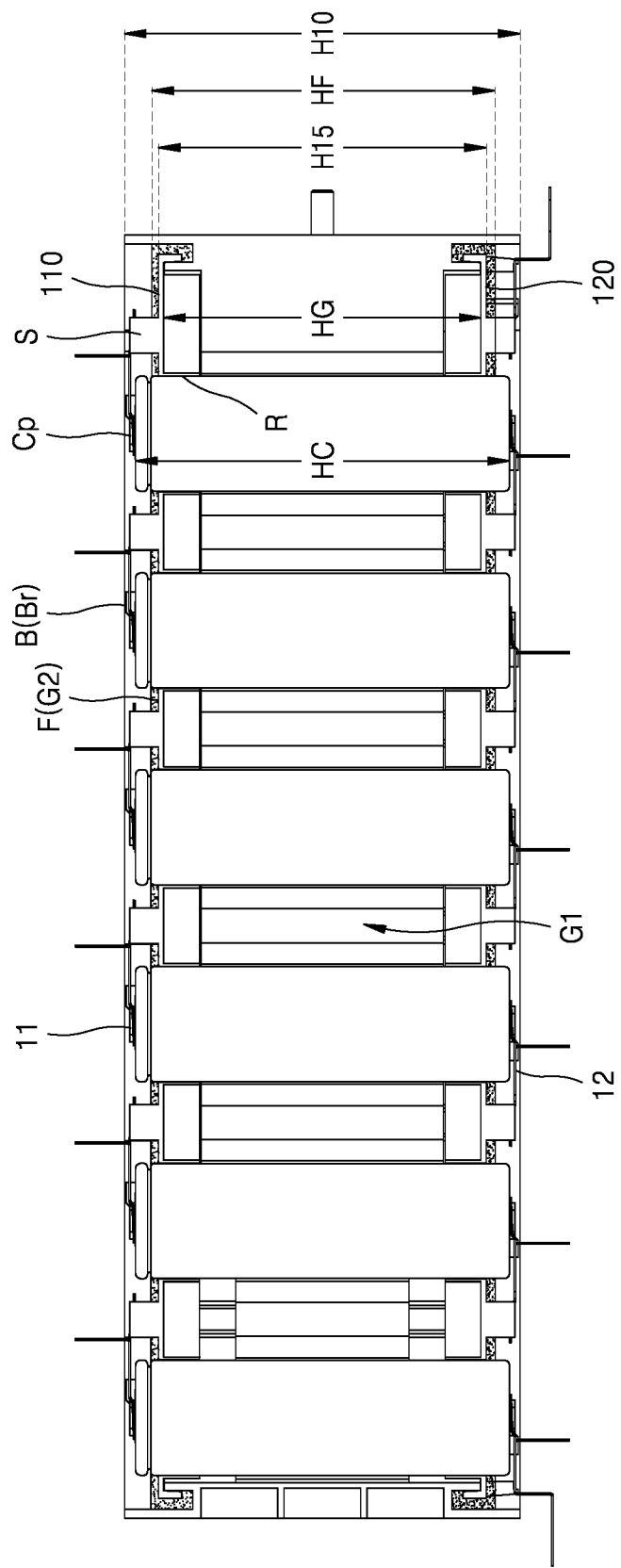
FIGS. 8A and 8B are a cross-sectional view illustrating the battery pack shown in FIG. 7, and an enlarged cross-sectional view illustrating a portion of the battery pack shown in FIG. 8A, respectively.
Figure 8B:
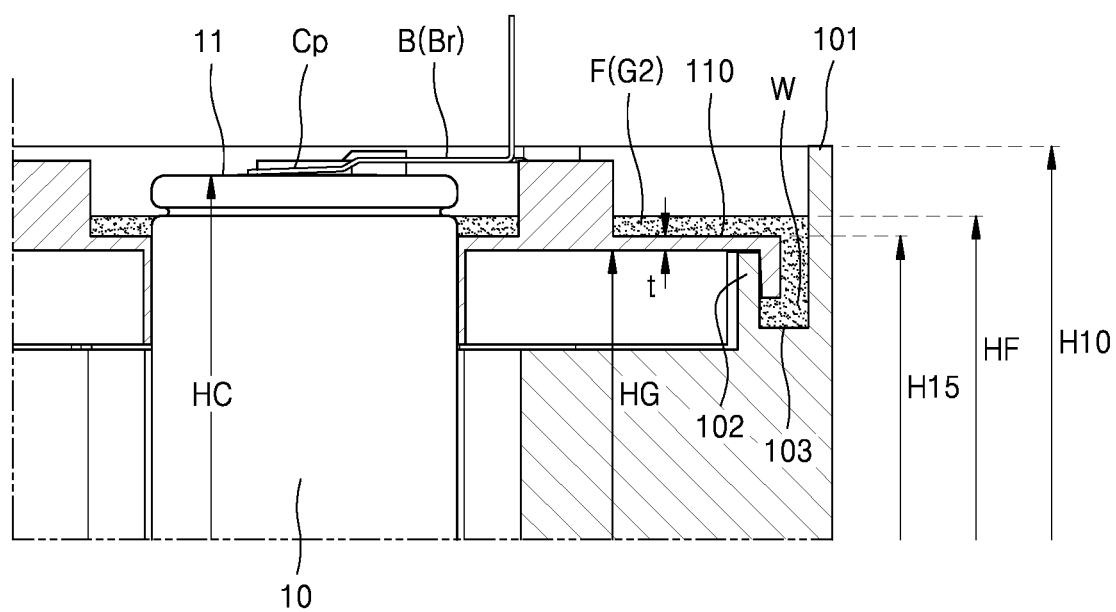
Figure 9:
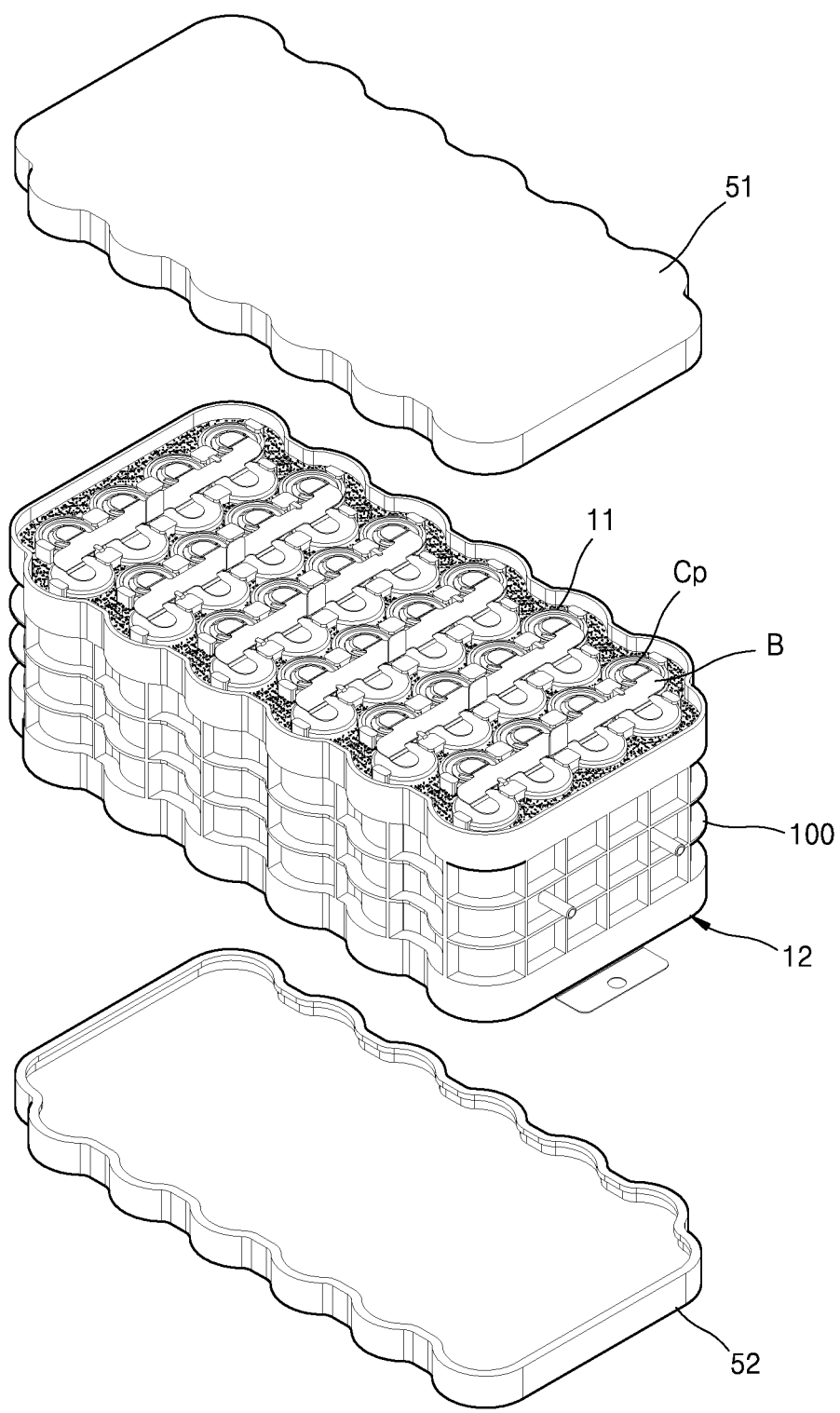
FIG. 9 is a partially exploded perspective view illustrating a cover coupled to the battery pack shown in FIG. 7.

FIG. 7 is a cutaway perspective view illustrating filling of a potting resin in a battery pack according to an embodiment; FIGS. 8A and 8B are a cross-sectional view illustrating the battery pack shown in FIG. 7, and an enlarged cross-sectional view illustrating a portion of the battery pack shown in FIG. 8A, respectively; and FIG. 9 is a partially exploded perspective view illustrating a cover coupled to the battery pack shown in FIG. 7.

Referring to FIGS. 7, 8A, and 8B, in an embodiment, a potting resin F may be formed to a certain height (e.g., a predetermined height) from the first and second holder plates 110 and 120, and may not cover the first and second end portions 11 and 12 of the battery cells 10. That is, the height HF of the potting resin F may be less than the height HC of the battery cells 10, that is, HF<HC. A vent V (refer to FIG. 7) may be formed in at least one of the first and second end portions 11 and 12 of each of the battery cells 10, and, thus, the potting resin F may not cover the first and second end portions 11 and 12 of the battery cells 10 so as not to hinder or block the release of pressure from the insides of the battery cells 10 through the vents V. In an embodiment, the vents V (refer to FIG. 7) may be formed along the edges of the first end portions 11 or the second end portions 12 of the battery cells 10. In an embodiment, two rows of battery cells 10 connected through a bus bar B may be arranged upside down relative to each other in the height direction of the battery cells 10 such that the positive and negative polarities of the two rows of battery cells 10 may be reversed, and, thus, the vents V (refer to FIG. 7) may be formed in the first end portions 11 or the second end portions 12 according to the positions of the battery cells 10. In the present embodiment, the height HF (refer to FIGS. 8A and 8B) of the potting resin F may be greater than the height H15 between the first and second holder plates 110 and 120 on which the potting resin F is formed, but may be less than the height HC of the battery cells 10, that is, H15<HF<HC.

As described above, since the first and second end portions 11 and 12 of the battery cells 10 are exposed from the potting resin F, the coupling portions Cp between the bus bars B and the first and second end portions 11 and 12 of the battery cells 10 may be exposed. However, the coupling portions Cp may be protected from environmental factors by first and second covers 51 and 52 which cover the case 100, as shown in FIG. 9. That is, the first and second covers 51 and 52 may be assembled to cover the case 100 in mutually-facing directions with the case 100 therebetween, and, thus, the coupling portions Cp between the bus bars B and the first and second end portions 11 and 12 may be protected without being exposed to the outside.

Figure 10:
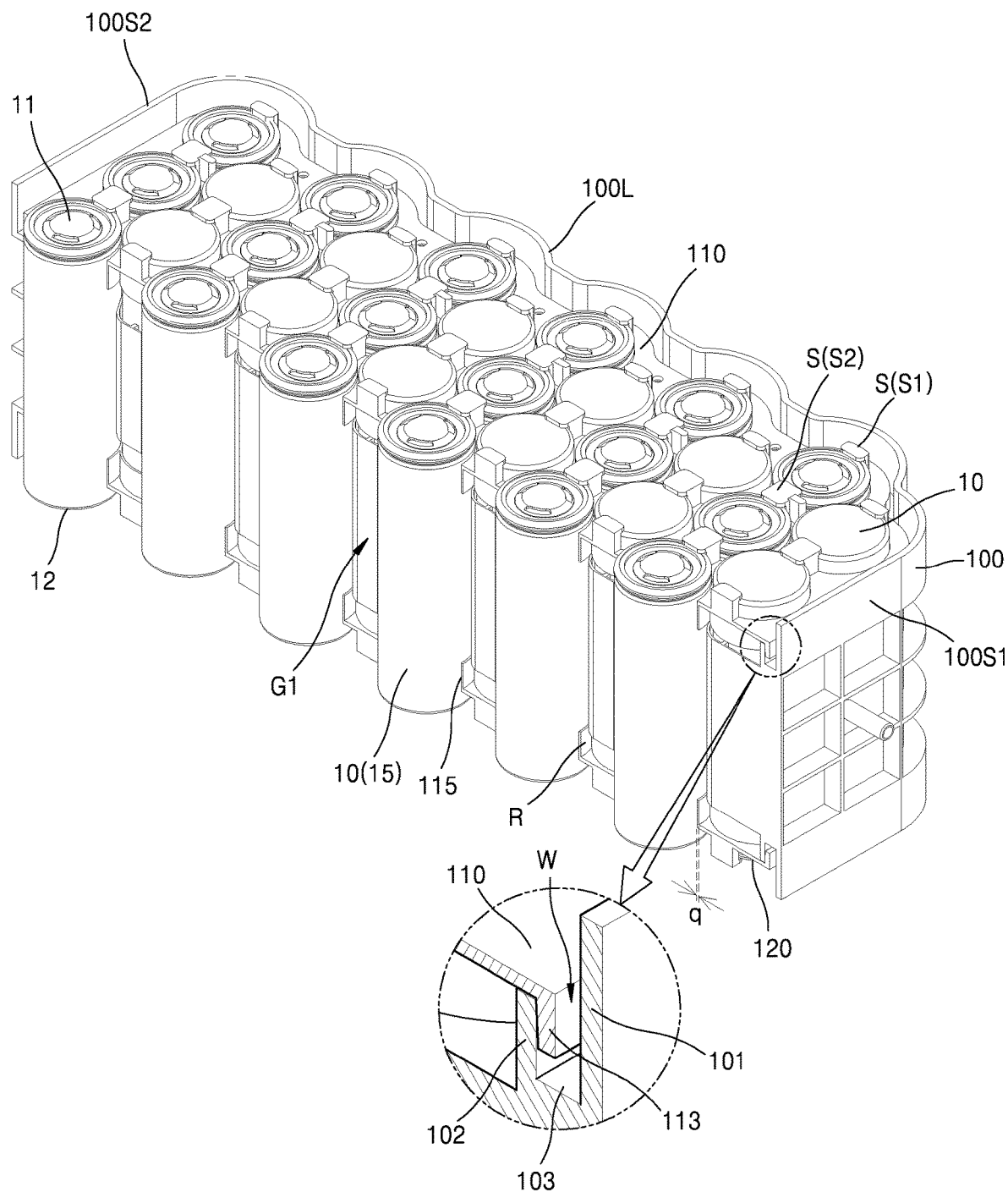
FIG. 10 is a perspective view illustrating a portion of the battery pack shown in FIG. 4.
Figure 11:
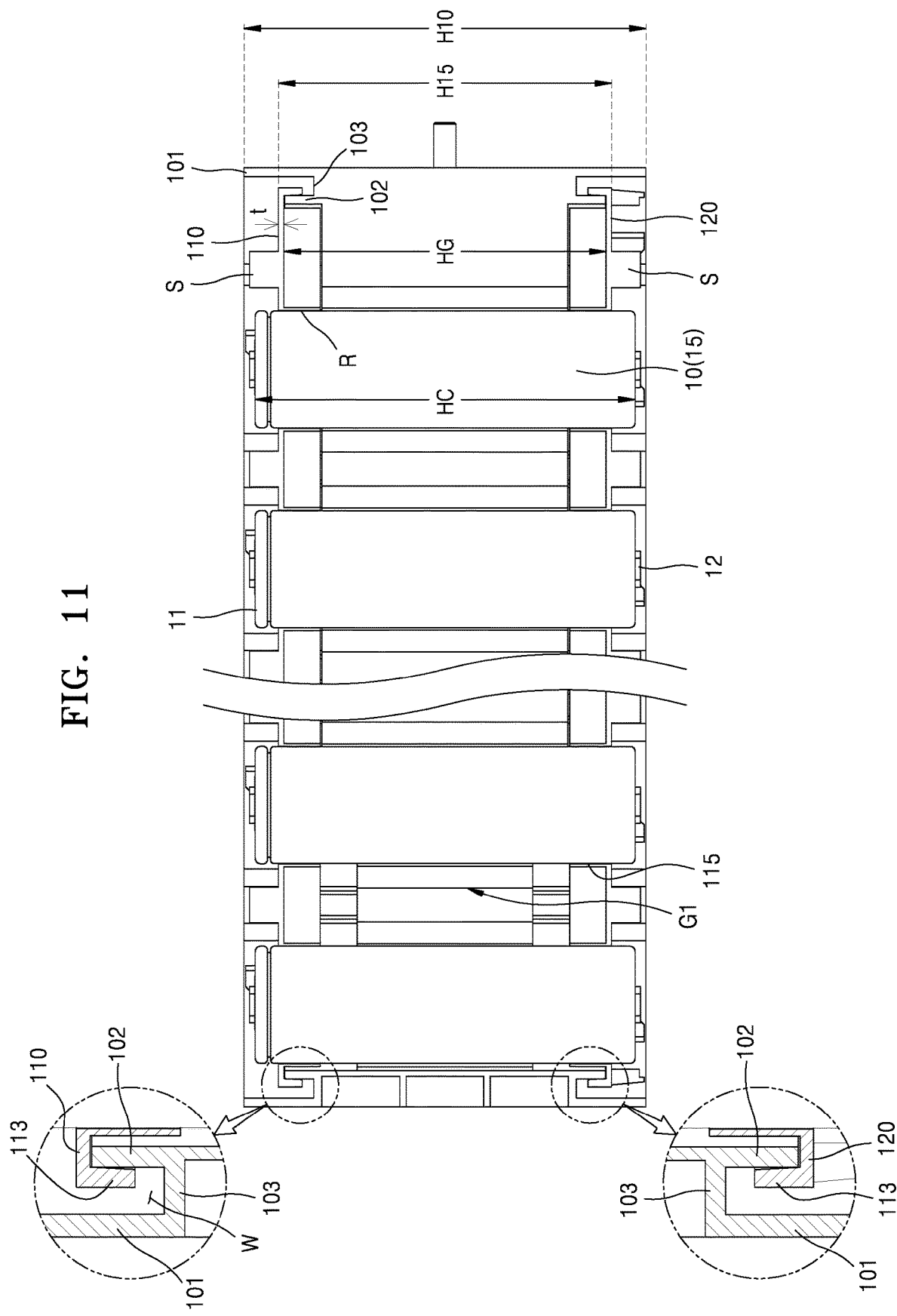
FIG. 11 is a cross-sectional view illustrating the battery pack shown in FIG. 10.
Figure 12:
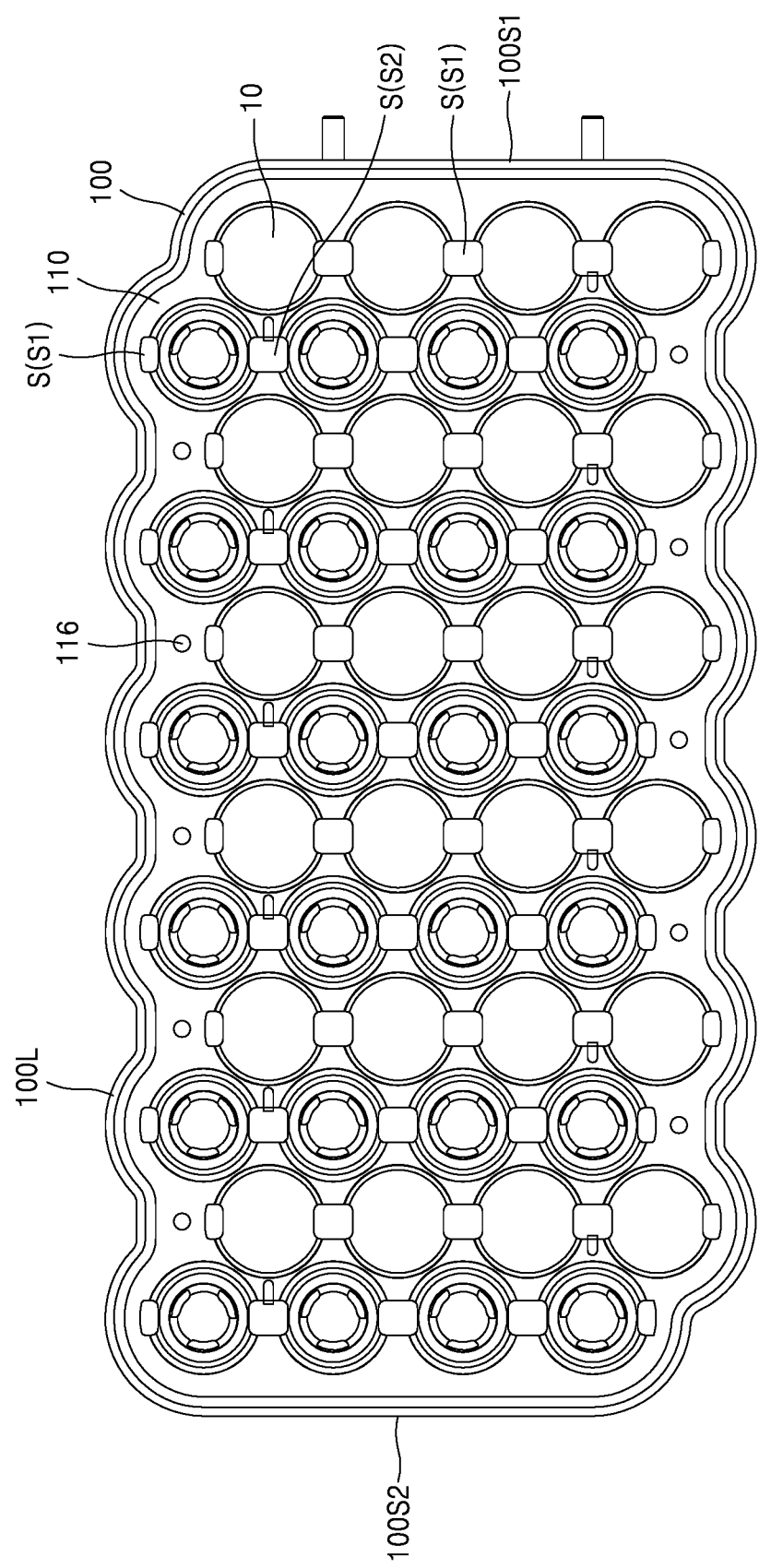
FIG. 12 is a plan view illustrating the battery pack shown in FIG. 10.
Figure 13:
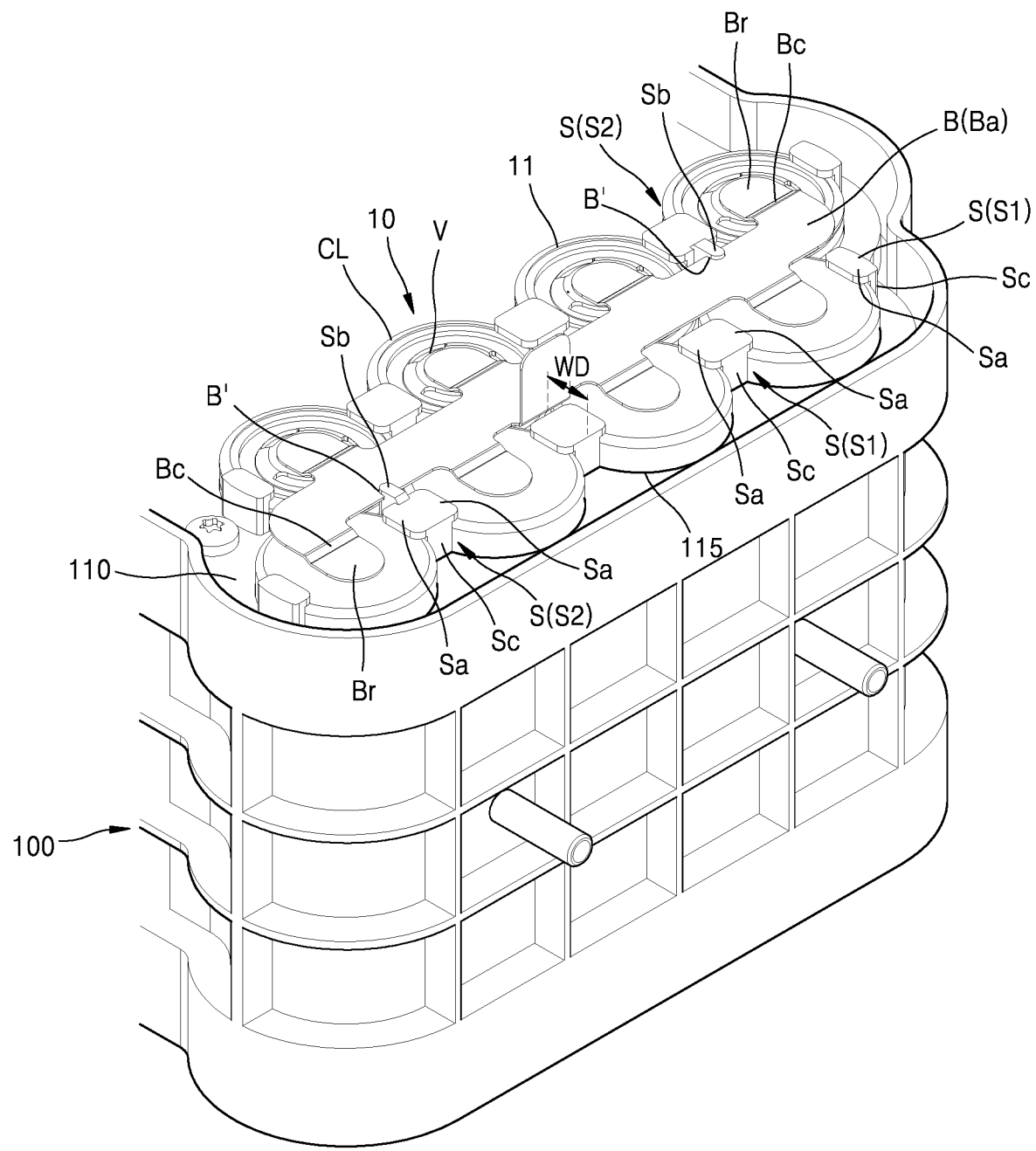
FIG. 13 is an enlarged perspective view illustrating a portion of the battery pack shown in FIG. 10.

The structures of the first and second holder plates 110 and 120 will now be described. FIG. 10 is a perspective view illustrating a portion of the battery pack shown in FIG. 4; FIG. 11 is a cross-sectional view illustrating the battery pack shown in FIG. 10; FIG. 12 is a plan view illustrating the battery pack shown in FIG. 10; and FIG. 13 is an enlarged perspective view illustrating a portion of the battery pack shown in FIG. 10.

Referring to FIGS. 10 and 11, the first and second holder plates 110 and 120 may be assembled to the case 100 to face each other along the case 100 and may be located at heights at which the first and second end portions 11 and 12 of the battery cells 10 may be exposed through the first and second holder plates 110 and 120, such that the first and second end portions 11 and 12 of the battery cells 10 having electrical polarities may not be in contact with the cooling fluid. In other words, the height HC (refer to FIG. 11) of the battery cells 10 may be greater than the height H15 between the first and second holder plates 110 and 120, which are assembled to the case 100, and, in an embodiment, the first and second end portions 11 and 12 of the battery cells 10 may be exposed from the accommodation space G1 of the cooling fluid away from the first and second holder plates 110 and 120. Here, the height H15 between the first and second holder plates 110 and 120 may be regulated by the inner walls 102 of the case 100 which are in contact with the first and second holder plates 110 and 120.

The height H10 of the case 100 may be greater than at least the height HC of the battery cells 10. The case 100 is for accommodating the battery cells 10, and, thus, the height H10 of the case 100 may be greater than at least the height HC of the battery cells 10 to sufficiently accommodate the battery cells 10. As described above, the potting resin F may be applied over the first and second holder plates 110 and 120 to heights for covering the first and second end portions 11 and 12 exposed through the first and second holder plates 110 and 120, and, in an embodiment, the height H10 of the case 100 serving as a dam for containing the potting resin F may be greater than at least the height HC of the battery cells 10, such that the case 100 may have an additional height remaining even after accommodating the potting resin F. In an embodiment, as described above, the height HC of the battery cells 10 is greater than the height H15 between the first and second holder plates 110 and 120 assembled to the case 100, such that the first and second end portions 11 and 12 of the battery cells 10 may be exposed from the accommodation space G1 of the cooling fluid and protrude from the first and second holder plates 110 and 120. That is, the height H15 between the first and second holder plates 110 and 120, the height HC of the battery cells 10, and the height H10 of the case 100 may satisfy the following condition: H15<HC<H10.

Referring to FIGS. 3 and 10, the cell holes 115 may be formed in the first and second holder plates 110 and 120. The battery cells 10 may be inserted into the cell holes 115, and the assembling positions of the battery cells 10 may be determined according to the arrangement of the cell holes 115. For example, the cell holes 115 may determine the assembling positions of the battery cells 10 adjacent to each other to define spacings between the battery cells 10. Since spacings between the battery cells 10 adjacent to each other are ensured, the cooling fluid accommodated in the accommodation space G1 may flow smoothly along the circumference of each of the battery cells 10, and, thus, the battery cells 10 may be sufficiently cooled. In an embodiment, the cell holes 115 may be formed in a circular shape to surround the outer circumferential surfaces 15 of the battery cells 10.

Referring to FIG. 12, the cell holes 115 may be arranged in a plurality of rows according to the arrangement of the battery cells 10. In an embodiment, the arrangement of the cell holes 115 may be substantially the same as the arrangement of the battery cells 10. For example, cell holes 115 of adjacent rows may be densely arranged in such a manner that the cell holes 115 may be staggered and fitted into valleys between adjacent cell holes 115, while being densely staggered so as not to form any large empty space between adjacent battery cells 10, such as in a matrix pattern arrangement arranged side by side in row and column directions in a matrix. As described above, since the cell holes 115 of adjacent rows are densely arranged at staggered positions, the battery cells 10 may be compactly arranged, and, thus, the battery pack may have a high energy density relative to the volume of the battery pack.

For reference, in the present specification, the row or column direction may refer to the direction in which the battery cells 10 are arranged or the cell holes 115 defining the assembling positions of the battery cells 10 are arranged, and may refer to the direction in which a group of adjacent battery cells 10 (or cell holes 115) are linearly arranged. In the present specification, a direction parallel to the first and second short side portions 100S1 and 100S2 may be referred to as the column direction, and a direction parallel to the long side portions 100L may be referred to as the row direction. However, embodiments of the present disclosure are not limited thereto. For example, the bus bars B (for example, refer to the main bodies Ba shown in FIG. 2) may extend in the column direction of the battery cells 10 in some embodiments, and may extend in the row direction of the battery cells 10 in other embodiments.

Referring to FIGS. 3 and 10, the cell ribs R extending along the cell holes 115 may be formed on the first and second holder plates 110 and 120. The cell ribs R may extend inward from the first and second holder plates 110 and 120 and may surround the outer circumferential surfaces 15 of the battery cells 10 to stably support the battery cells 10. That is, the cell ribs R may extend in the height direction of the battery cells 10 to support the battery cells 10 in an upright position with respect to the first and second holder plates 110 and 120.

In the present specification, the inward directions of the first and second holder plates 110 and 120 may refer to directions in which the first and second holder plates 110 and 120 face each other, or directions in which the first and second holder plates 110 and 120 face the accommodation space G1 of the cooling fluid which is formed between the first and second holder plates 110 and 120. In addition, the outward directions of the first and second holder plates 110 and 120 may refer to directions in which the first and second holder plates 110 and 120 are away from each other, or directions in which the first and second holder plates 110 and 120 are away from the accommodation space G1 of the cooling fluid which is formed between the first and second holder plates 110 and 120. The inward and outward directions of the first and second holder plates 110 and 120 may be parallel with the height direction of the battery cells 10 and may be opposite each other.

The cell ribs R may protrude inward from the first and second holder plates 110 and 120 toward the accommodation space G1 of the cooling fluid. As described later, the assembling protrusions S which protrude from the first and second holder plates 110 and 120 together with the cell ribs R may be outward from the first and second holder plates 110 and 120 away from the accommodation space G1 of the cooling fluid. In this manner, the cell ribs R and the assembling protrusions S may protrude respectively in inward and outward directions of the first and second holder plates 110 and 120, that is, in opposite directions from the first and second holder plates 110 and 120. For example, the cell ribs R may protrude from inner surfaces of the first and second holder plates 110 and 120, and the assembling protrusions S may protrude from outer surfaces of the first and second holder plates 110 and 120.

In an embodiment, the cell ribs R may protrude in a cylindrical shape from the first and second holder plates 110 and 120 to surround the outer circumferential surfaces 15 of the battery cells 10. The cell ribs R may protrude from the first and second holder plates 110 and 120 at positions adjacent to the cell holes 115 into which the battery cells 10 are inserted, such that the cell ribs R may surround the outer circumferential surfaces 15 of the battery cells 10. For example, in an embodiment, the cell ribs R may protrude from walls of the first and second holder plates 110 and 120 that surround the cell holes 115 into which the battery cells 10 are inserted.

The cell ribs R may protrude from the first and second holder plates 110 and 120 in the height direction of the battery cells 10, and, in an embodiment, the protruding length of the cell ribs R may be as short as possible as long as the cell ribs R stably support the battery cells 10. The cell ribs R surround the outer circumferential surfaces 15 of the battery cells 10 while protruding inward from the first and second holder plates 110 and 120 toward the accommodation space G1 of the cooling fluid, and, in this case, the protruding length of the cell ribs R may be short so as not to hinder heat transfer between the cooling fluid and the outer circumferential surfaces 15 of the battery cells 10. For example, the cell ribs R may have a short length so as not to cover center portions of the battery cells 10 in the height direction of the battery cells 10. In an embodiment, the protruding length of the cell ribs R protruding from the first and second holder plates 110 and 120 in the height direction of the battery cells 10 may be about 10 mm when the height HC of the battery cells 10 is about 105 mm. That is, in an embodiment, the protruding length of the cell ribs R may be about 10% or less of the height HC of the battery cells 10, for example, about 9.5% of the height HC of the battery cells 10.

In an embodiment, the cell ribs R may completely surround the outer circumferential surfaces 15 of the battery cells 10. In an embodiment, the cell ribs R may be spaced apart from the outer circumferential surfaces 15 of the battery cells 10 by a gap (e.g., a predetermined gap) q (refer to FIG. 10), rather than being in close contact with the outer circumferential surfaces 15 of the battery cells 10, to allow the cooling fluid to make contact with the outer circumferential surfaces 15 of the battery cells 10. The cooling fluid may make contact with the outer circumferential surfaces 15 of the battery cells 10 at a certain flow rate to convectively transfer heat from the battery cells 10, and, for contact with the cooling fluid, the gap q (refer to FIG. 10) may be formed between the outer circumferential surfaces 15 of the battery cells 10 and the cell ribs R. In an embodiment, for example, the gap q (refer to FIG. 10) between the outer circumferential surfaces 15 of the battery cells 10 and the cell ribs R may be about 0.1 mm.

Referring to FIGS. 10 and 13, the assembling protrusions S may be formed on the first and second holder plates 110 and 120 to hold the first and second end portions 11 and 12 of the battery cells 10 for regulating the assembling positions of the battery cells 10 in the height direction. For reference, the cell holes 115 into which the battery cells 10 are inserted may define the assembling positions of the battery cells 10 in a plane in which the battery cells 10 are arranged, and the assembling protrusions S may regulate the assembling positions of the battery cells 10 in the height direction. The assembling protrusions S may protrude outward from the first and second holder plates 110 and 120. That is, the assembling protrusions S may protrude outward from the first and second holder plates 110 and 120 in directions opposite the cell ribs R. For example, the assembling protrusions S may protrude from the outer surfaces of the first and second holder plates 110 and 120, and the cell ribs R may protrude from the inner surfaces of the first and second holder plates 110 and 120.

In an embodiment, the assembling protrusions S may protrude from the circumferences of the cell holes 115 of the first and second holder plates 110 and 120 into which the battery cells 10 are inserted, so as to hold the first and second end portions 11 and 12 of the battery cells 10. In an embodiment, two or more assembling protrusions S may be formed on the circumference of each cell hole 115 of the first and second holder plates 110 and 120 at symmetrical positions to hold edge positions of each battery cell 10 in a balanced state. In an embodiment, a pair of assembling protrusions S may be formed at opposite positions along the circumference of each cell hole 115.

In an embodiment, the assembling protrusions S are formed at positions between neighboring cell holes 115 (or neighboring battery cells 10) in the rows of the cell holes 115 (or the battery cells 10) such that one assembling protrusion S may concurrently (e.g., simultaneously) hold two battery cells 10 inserted into neighboring cell holes 115. However, embodiments of the present disclosure are not limited thereto, and, in other embodiments, the assembling protrusions S may be formed such that one assembling protrusion S may be among three cell holes 115 having adjacent circumferences and may thus concurrently (e.g., simultaneously) hold three battery cells 10 inserted into the cell holes 115 adjacent to each other. As described above, in an embodiment, in the structure in which one assembling protrusion S is arranged among three cell holes 115 having adjacent circumferences, a number (e.g., a maximum number) of assembling protrusions S arranged between one cell hole 115 and six cell holes 115 surrounding the cell hole 115 may be six, and the number of assembling protrusions S surrounding one cell hole 115 may be different within the range of six or less according to designs. In addition, the assembling protrusions S surrounding one cell hole 115 may be at symmetric or asymmetric positions.

The assembling protrusions S (outer assembling protrusions S) may also be formed on the outer sides of the outermost cell holes 115 (or the outermost battery cells 10) in the rows of the cell holes 115 (or the battery cells 10), and each of the outer assembling protrusions S may hold one battery cell 10. That is, each of inner assembling protrusions S formed along the rows of the cell holes 115 (or the battery cells 10) may concurrently (e.g., simultaneously) hold two battery cells 10 inserted into neighboring cell holes 115, and each of the outer assembling protrusions S formed along the rows of the cell holes 115 (or the battery cells 10) may hold one battery cell 10 inserted into an outermost cell hole 115.

Referring to FIG. 13, in an embodiment, each of the inner assembling protrusions S formed along the rows of the cell holes 115 (or the battery cells 10) may include: a center protrusion portion Sc protruding outward from the first and second holder plates 110 and 120; and a pair of first protrusion portions Sa branching off from the center protrusion portion Sc toward cell holes 115 (or battery cells 10) located on both sides. In addition, each of the outer assembling protrusions S formed along the rows of the cell holes 115 (or the battery cells 10) may include: a center protrusion portion Sc protruding outward from the first and second holder plates 110 and 120; and a first protrusion portion Sa protruding from the center protrusion portion Sc toward a cell hole 115 (an outermost cell hole 115 or an outermost battery cell 10). In an embodiment, the first protrusion portions Sa and the center protrusion portions Sc may be formed in a plate shape and may have substantially a same width WD.

The assembling protrusions S may protrude outward from the first and second holder plates 110 and 120 to hold the first and second end portions 11 and 12 of the battery cells 10 such that the battery cells 10 may not be separated from the first and second holder plates 110 and 120. For example, the first and second end portions 11 and 12 of the battery cells 10 may be securely fixed by the assembling protrusions S protruding from the first and second holder plates 110 and 120. For example, the assembling protrusions S may not cover vents V formed in the first and second end portions 11 and 12 of the battery cells 10 so as not to hinder or block the release of internal pressure from the battery cells 10, and may thus protrude only up to clamping portions CL formed on edge portions of the battery cells 10 to physically interfere with only the clamping portions CL which surround the vents V of the battery cells 10.

The assembling protrusions S may hold the first and second end portions 11 and 12 of the battery cells 10 at heights to which the assembling protrusions S protrude outward from the first and second holder plates 110 and 120, thereby fixing the first and second end portions 11 and 12 of the battery cells 10 at positions outside the first and second holder plates 110 and 120 and allowing the center portions of the battery cells 10 to be exposed to the cooling fluid.

In an embodiment, since the first and second end portions 11 and 12 of the battery cells 10 correspond to electrodes to which charge and discharge currents are input or output, the first and second end portions 11 and 12 of the battery cells 10 are fixed at heights which are outside the first and second holder plates 110 and 120 forming the accommodation space G1 of the cooling fluid, thereby insulating the first and second end portions 11 and 12 from the cooling fluid.

Some of the assembling protrusions S may hold the first and second end portions 11 and 12 of the battery cells 10 and also hold bus bars B electrically connected to the battery cells 10. For example, according to an embodiment, the assembling protrusion S may include: first assembling protrusions 51 for holding the first and second end portions 11 and 12 of the battery cells 10; and second assembling protrusions S2 for holding the first and second end portions 11 and 12 of the battery cells 10 and the bus bars B as well. Hereinafter, the second assembling protrusions S2 will be described.

In an embodiment, each of the bus bars B may electrically connect two neighboring rows of battery cells 10. In this case, the main body Ba of the bus bar B may extend between assembling protrusions S arranged in two rows along the two neighboring rows of battery cells 10. In addition, among the assembling protrusions S arranged in two rows with the main body Ba of the bus bar B therebetween, two assembling protrusions S separate from each other may correspond to the second assembling protrusions S2 which fix the main body Ba of the bus bar B.

The main body Ba of the bus bar B may extend between the outermost branches Br provided on both ends thereof, and, in this case, the second assembling protrusions S2 may be assembling protrusions S adjacent to the outermost branches Br. For example, the second assembling protrusions S2 may be assembling protrusions S adjacent to inner sides of the outermost branches Br, and each of the second assembling protrusions S2 may include first protrusion portions Sa for holding battery cells 10 and a second protrusion portion Sb for holding the bus bar B. For reference, unlike the second assembling protrusions S2, the first assembling protrusions 51, which hold the first and second end portions 11 and 12 of the battery cells 10 without physical interference with the bus bars B, may include first protrusion portions Sa but may not include second protrusion portions Sb.

In an embodiment, the first and second protrusion portions Sa and Sb of each of the second assembling protrusions S2 may be centered on the center protrusion portion Sc and may protrude in different directions from the center protrusion portion Sc which protrudes outward from the first and second holder plates 110 and 120. That is, the first protrusion portions Sa may protrude from the center protrusion portion Sc in both lateral directions along the rows of the battery cells 10, and the second protrusion portion Sb may protrude from the center protrusion portion Sc toward the main body Ba of the bus bar B. In other words, each of the second assembling protrusions S2 may include: a pair of first protrusion portions Sa formed on both sides of the center protrusion portion Sc; and a second protrusion portion Sb protruding from the center protrusion portion Sc between the first protrusion portions Sa. In an embodiment, the first protrusion portions Sa may have substantially the same width WD as the center protrusion portion Sc, and the second protrusion portion Sb may have a width less than the width WD of the first protrusion portions Sa. In this case, the widths of the first protrusion portions Sa and the center protrusion portion Sc may be measured in the same direction which is different, for example by 90 degrees, from the direction in which the width of the second protrusion portion Sb is measured.

The first and second protrusion portions Sa and Sb are respectively configured to fix the positions of the first and second end portions 11 and 12 of the battery cells 10 and the bus bar B and may have different structures which respectively physically interfere with the first and second end portions 11 and 12 of the battery cells 10 and the bus bar B. For example, the first protrusion portions Sa may protrude in directions crossing the first and second end portions 11 and 12 of the battery cells 10 and at a level away from the first and second end portions 11 and 12 in the height direction of the battery cells 10 such that the first protrusion portions Sa may function as stoppers for the first and second end portions 11 and 12 and may hold the first and second end portions 11 and 12 to place the battery cells 10 at designated positions in the height direction. The second protrusion portion Sb may protrude at the same level as the bus bar B in the height direction of the battery cells 10 and may extend in a direction crossing the bus bar B so as to be inserted into a receiving slot B' of the bus bar B. The bus bars B may be supported on the first and second end portions 11 and 12 of the battery cells 10 such that additional support structures may not be required for the bus bars B in the height direction of the battery cells 10, and, for example, as the second protrusion portions Sb are fitted into the receiving slots B', the bus bars B may be fixed without movement at a level perpendicular to the height direction of the battery cells 10.

For example, in each of the second assembling protrusions S2, the first and second protrusion portions Sa and Sb may protrude from the center protrusion portion Sc. In an embodiment, the first protrusion portions Sa may have a small thickness in the height direction of the battery cells 10 and may protrude at a level away from the first and second end portions 11 and 12 of the battery cells 10 in directions crossing the first and second end portions 11 and 12, and the second protrusion portion Sb may have a relatively large thickness in the height direction of the battery cells 10 and may be inserted into the receiving slot B' of the bus bar B at the same level as the level of the bus bar B.

The second protrusion portions Sb may be inserted into the receiving slots B' formed in the main body Ba of the bus bar B at diagonal positions based on the main body Ba of the bus bar B such that the main body Ba of the bus bar B may be supported in a balanced manner. For example, the second protrusion portions Sb may be inserted at diagonal positions based on the main body Ba of the bus bar B, and, thus, the main body Ba of the bus bar B may be stably supported. The receiving slots B' may be intermittently formed along the main body Ba of the bus bar B at diagonally distant positions corresponding to the positions of the second protrusion portions Sb.

In an embodiment, the second protrusion portions Sb may have a height difference in an outward (for example, upward) direction from the first protrusion portions Sa. For example, at least outer surfaces (for example, upper surfaces) of the second protrusion portions Sb may have a height difference in an outward (for example, upward) direction from outer surfaces (for example, upper surfaces) of the first protrusion portions Sa in the height direction of the battery cells 10. That is, the second protrusion portions Sb, which are for holding the main body Ba of the bus bar B, may have a height difference outward (for example, upward) from the first protrusion portions Sa, which are for holding the first and second end portions 11 and 12 of the battery cells 10. The main body Ba of the bus bar B may have a height difference in an outward (for example, upward) direction from the first and second end portions 11 and 12 of the battery cells 10 because the branches Br are bent in a stepped shape in an inward (for example, downward) direction from the main body Ba (at bent portions Bc) and connected to the first and second end portions 11 and 12 of the battery cells 10. That is, the second protrusion portions Sb, which are for holding the main body Ba of the bus bar B, may have a height difference outward (for example, upward) from the first protrusion portions Sa, which are for holding the first and second end portions 11 and 12 of the battery cells 10. For reference, since the branches Br of the bus bar B are bent in a stepped shape in an inward (for example, downward) direction from the main body Ba toward the first and second end portions 11 and 12 of the battery cells 10, the branches Br may be brought into tight contact with the first and second end portions 11 and 12 of the battery cells 10, and, thus, the welding strength between the branches Br and the first and second end portions 11 and 12 may be improved.

For example, the second assembling protrusions S2 may fix the position of the bus bar B (for example, the main body Ba), and, in addition to this, since the bus bar B (for example, the branches Br) is welded to the first and second end portions 11 and 12 of the battery cells 10, the position of the bus bar B may be more securely fixed. For example, the battery cells 10 and the bus bar B may be fixed to each other through the second assembling protrusions S2 during welding such that the battery cells 10 and the bus bar B may be stably welded to each other.

In an embodiment, the branches Br of the bus bar B and the assembling protrusions S may be staggered in a zigzag pattern. For example, in an embodiment, each of the bus bars B may electrically connect two neighboring rows of battery cells 10 to each other. In this case, the two rows of battery cells 10, which are connected to each other through the bus bar B may be arranged in a zigzag pattern in which battery cells 10 in one row are placed in valleys between battery cells 10 in the other row. Therefore, the branches Br of the bus bar B connected to the first and second end portions 11 and 12 (for example, electrodes formed in center portions of the first and second end portions 11 and 12) of the battery cells 10 may be arranged in a zigzag pattern centered on the main body Ba of the bus bar B, and the assembling protrusions S holding the first and second end portions 11 and 12 (for example, both edge portions of the first and second end portions 11 and 12) of the battery cells 10 may be arranged in a zigzag pattern. In addition, the branches Br and the assembling protrusions S may be arranged in a zigzag pattern centered on the main body Ba of the bus bar B while being staggered. As such, the branches Br and the assembling protrusion S are all brought into contact with the first and second end portions 11 and 12 of the battery cells 10 at different positions of the first and second end portions 11 of the battery cells 10. That is, the branches Br may be connected to the electrodes formed in the center portions of the first and second end portions 11 and 12 of the battery cells 10, and the assembling protrusions S may hold lateral edge portions of the first and second end portions 11 and 12 of the battery cells 10.

Figure 14:
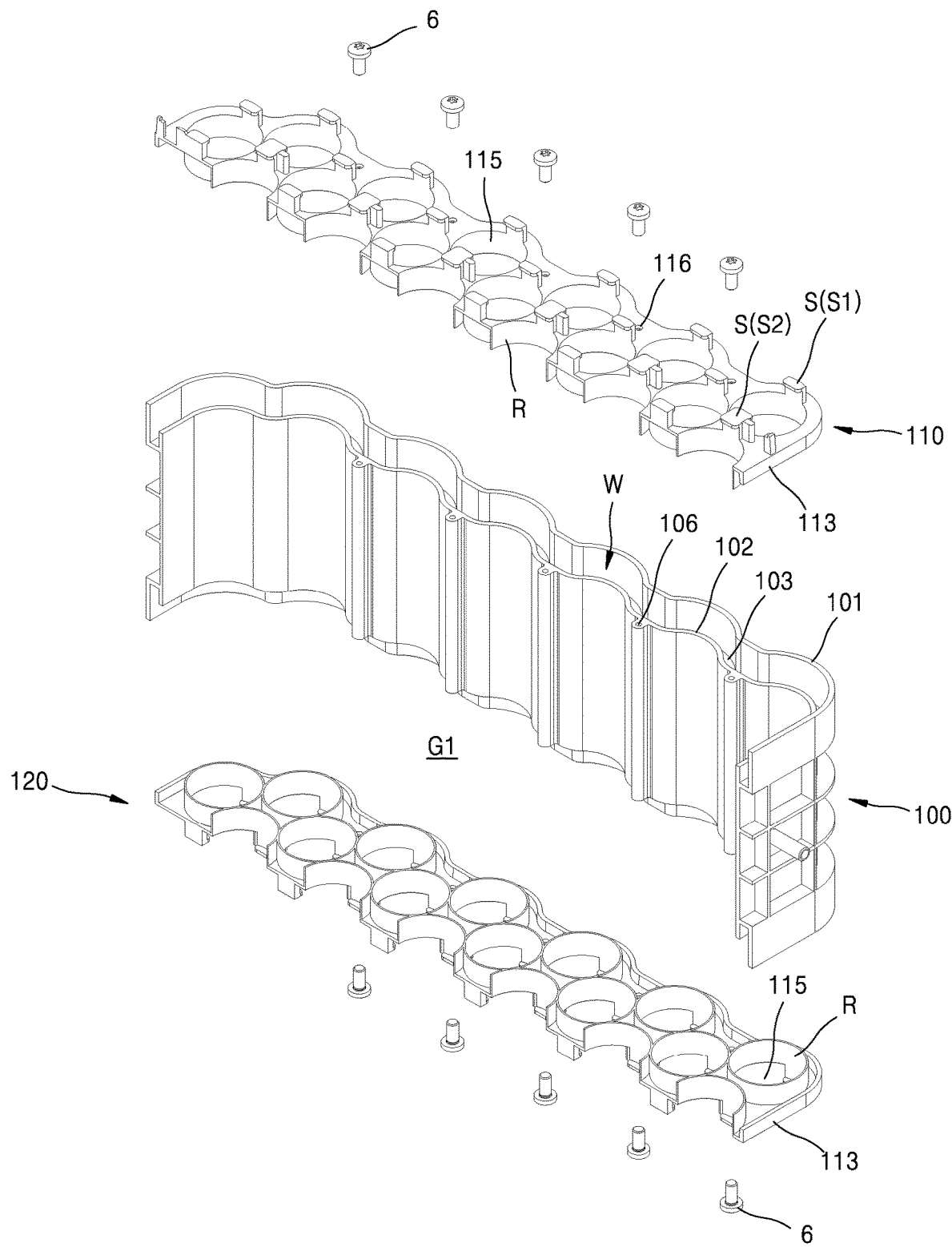
FIG. 14 is a view illustrating a manner in which first and second holder plates and a case of the battery pack shown in FIG. 10 are coupled to each other and assembled together.

FIG. 14 is a view illustrating a manner in which the first and second holder plates 110 and 120 and the case 100 which are shown in FIG. 10 are coupled to each other and assembled together.

Referring to FIGS. 11 and 14, the skirt portions 113 may be formed on edges of the first and second holder plates 110 and 120 for assembling with the case 100. For example, the skirt portions 113 may be formed along the edges of the first and second holder plates 110 and 120 in an inwardly bent shape. The skirt portions 113 formed on the edges of the first and second holder plates 110 and 120 may be inserted into the well spaces W between the outer walls 101 and the inner walls 102 formed along the edges of the case 100. For example, when the first and second holder plates 110 and 120 are assembled to the case 100 while being slid inward along the case 100, the skirt portions 113 formed on the edges of the first and second holder plates 110 and 120 may be inserted into the well spaces W between the outer walls 101 and the inner walls 102 formed on the edges of the case 100, and, thus, the first and second holder plates 110 and 120 may be coupled to the case 100. In an embodiment, the skirt portions 113 may be inserted into the well spaces W between the outer walls 101 and the inner walls 102 of the case 100, for example, while being brought into tight contact with the inner walls 102 to surround the inner walls 102 rather than being brought into tight contact with the outer walls 101, such that the first and second holder plates 110 and 120 on which the skirt portions 113 are formed may be assembled to the case 100 while surrounding the case 100.

As described above, the first and second holder plates 110 and 120 having the skirt portions 113 may be assembled to the case 100 while surrounding the inner walls 102 of the case 100, and then the first and second holder plates 110 and 120 and the case 100 may be fastened to each other using fastening members 6 (refer to FIG. 14). For example, coupling holes 116 may be formed in the first and second holder plates 110 and 120 to insert the fastening members 6 (refer to FIG. 14) through the coupling holes 116, and coupling flange portions 106 to be fastened may be formed on the case 100 to couple the fastening members 6 to the coupling flange portions 106. For example, the first and second holder plates 110 and 120 and the case 100 may be coupled to each other by inserting the fastening members 6 through the coupling holes 116 of the first and second holder plates 110 and 120 and tightening the fastening members 6 in the coupling flange portions 106. The coupling holes 116 of the first and second holder plates 110 and 120 may be formed at positions corresponding to the coupling flange portions 106 of the case 100. For example, the coupling holes 116 may be formed in the first and second holder plates 110 and 120 at positions adjacent to the skirt portions 113 surrounding the inner walls 102 of the case 100 in an intermittent manner along the edges of the first and second holder plates 110 and 120 on which the skirt portions 113 are formed. The coupling flange portions 106 may be formed at positions adjacent to the inner walls 102 of the case 100 in an intermittent manner along the inner walls 102 and may protrude toward the accommodation space G1 formed in the center portion of the case 100.

In consideration of the coupling strength between the first and second holder plates 110 and 120 and the case 100, a plurality of coupling holes 116 and a plurality of coupling flange portions 106 may be formed on the first and second holder plates 110 and 120 and the case 100 at corresponding positions, and the coupling strength between the first and second holder plates 110 and 120 and the case 100 may be increased using the fastening members 6. For example, the coupling holes 116 may be formed at intermittent positions along the edges of the first and second holder plates 110 and 120 on which the skirt portions 113 are formed, and the coupling flange portions 106 may be formed at intermittent positions along the inner walls 102.

Referring to FIG. 12, two neighboring rows of battery cells 10 may be arranged in a zigzag pattern in which battery cells 10 are densely arranged in valleys between neighboring battery cells 10. In this case, battery cells 10 in one of the two neighboring rows may be relatively shifted to the left such that areas for forming coupling holes 116 may be provided at positions to the right of the first and second holder plates 110 and 120, and, similarly, battery cells 10 in the other of the two neighboring rows may be relatively shifted to the right such that areas for forming coupling holes 116 may be provided at positions to the left of the first and second holder plates 110 and 120. Therefore, the first and second holder plates 110 and 120 may not require additional areas for forming the coupling holes 116. For reference, the positions to the left or the positions to the right may be positions adjacent to one side and the other side of the rows of the battery cells 10 which are parallel to the first and second short side portions 100S1 and 100S2 of the case 100. As described above, the coupling holes 116 of the first and second holder plates 110 and 120 may be formed at alternating positions to the left and right in the row direction of the battery cells 10, and the coupling flange portions 106 (refer to FIG. 14) may be formed at positions corresponding to the coupling holes 116.

Figure 15:
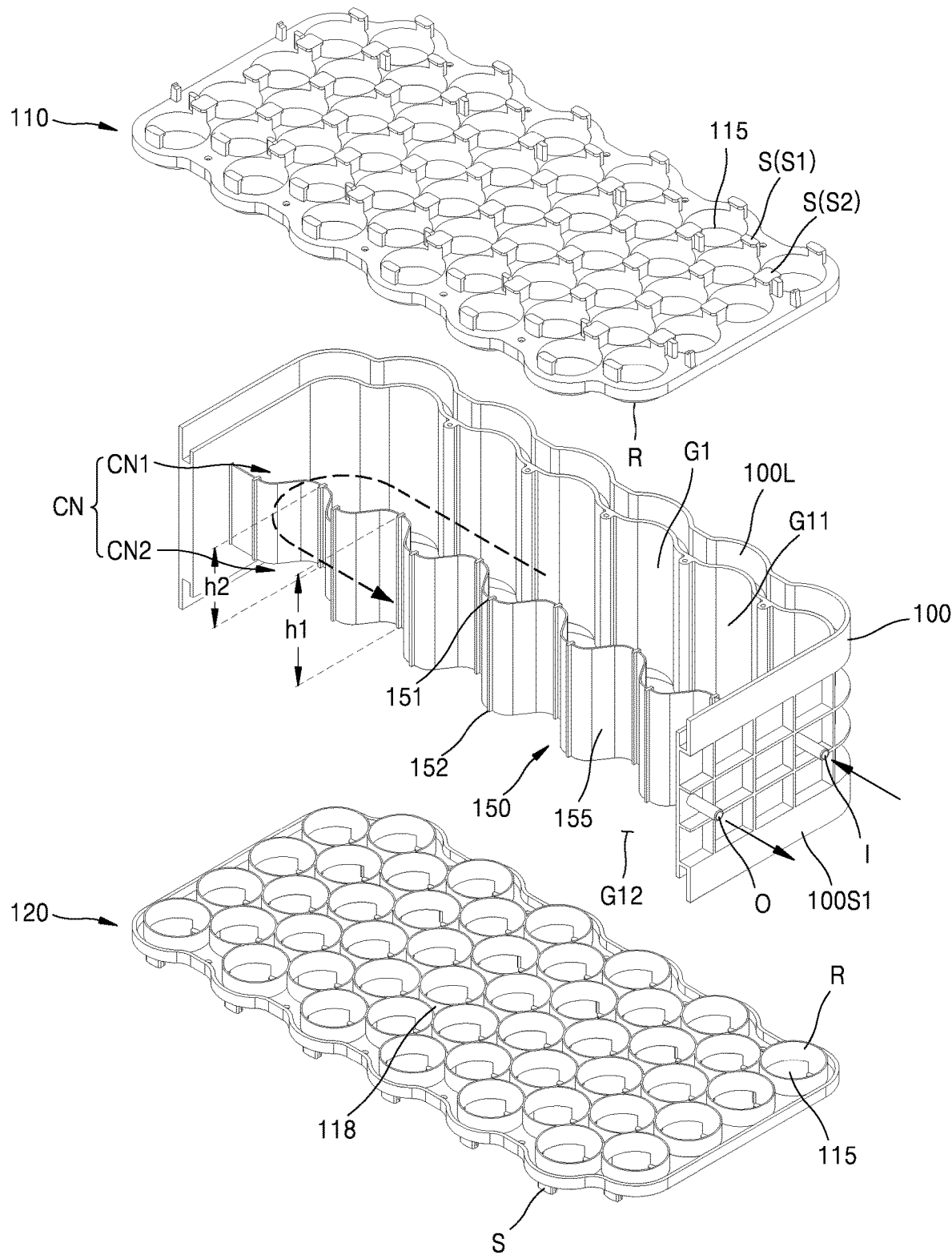

FIGS. 15 and 16 are a perspective view and a plan view, respectively, which illustrate a partition wall structure of a battery pack according to an embodiment.

Referring to FIG. 15, the accommodation space G1 may be formed between the first and second holder plates 110 and 120 that are assembled to face each other along the case 100. In an embodiment, the accommodating space G1 may accommodate a flow of a cooling fluid for cooling the battery cells 10, and a partition wall 150 may extend across the accommodating space G1 of the case 100 to divide the accommodation space G1 into an upstream portion G11 and a downstream portion G12. In an embodiment, for example, the partition wall 150 may be integrally formed with the case 100.

The upstream portion G11 may be connected to the inlet I of the cooling fluid such that the cooling fluid may flow into the upstream portion G11 at a relatively low temperature, and the downstream portion G12 may be connected to the outlet O of the cooling fluid such that the cooling fluid may flow outward from the downstream portion G12 at a relatively high temperature. The inlet I and the outlet O of the cooling fluid may be formed at an end side in the extending direction of the partition wall 150, and a communication portion CN may be provided at the other end side in the extending direction of the partition wall 150 to connect the upstream portion G11 and the downstream portion G12 to each other. For example, the extending direction of the partition wall 150 may be parallel to the long side portions 100L.

The communication portion CN may connect the upstream portion G11 and the downstream portion G12 to each other, and, thus, the cooling fluid flowing in the upstream portion G11 in a direction from the inlet I of the end side toward the other end side may be reversed, that is, turned in a U-shape, and may flow in the downstream portion G12 in a direction from the other end side toward the outlet O of the end side.

The inlet I and the outlet O may be formed at the end side in the extending direction of the partition wall 150, for example, at the first short side portion 100S1 of the case 100. As described above, the inlet I and the outlet O are formed together in the first short side portion 100S1 of the case 100, and, for example, since the inlet I and the outlet O are not respectively formed in the first and second short side portions 100S1 and 100S2 that are opposite each other, but are formed together in the first short side portion 100S1, fluid connection to the case 100 may be easily made. In an embodiment, for example, the case 100 may include: the pair of long side portions 100L parallel to the extending direction of the partition wall 150; and the first and second short side portions 100S1 and 100S2 connecting the pair of long side portions 100L to each other, wherein the inlet I and the outlet O may be formed together in the first short side portion 100S1 rather than being respectively formed in the first and second short side portions 100S1 and 100S2.

In the present embodiment, the inlet I and the outlet O are formed in the first short side portion 100S1 of the case 100, and the flow of the cooling fluid is directed from the inlet I toward the outlet O using the partition wall 150 provided in the case 100 by reversing the flow of the cooling fluid in a U-turn manner at the second short side portion 100S2, such that relatively large flow resistance may be applied to the flow of the cooling fluid to completely or nearly completely fill the inside (accommodation space G1) of the case 100 with the cooling fluid.

In an embodiment, one inlet I and one outlet O may be formed together in the first short side portion 100S1 of the case 100 as a pair. However, embodiments of the present disclosure are not limited thereto. In another embodiment, inlets I and outlets O may be respectively formed in the first and second short sides 100S1 and 100S2 of the case 100, and the number of inlets I and the number of outlets O may be equal to each other or different from each other, and may each be at least two. In an embodiment, for example, referring to FIG. 15, one partition wall 150 is provided in the case 100 to divide the accommodation space G1 into two portions: the upstream portion G11 connected to the inlet I, and the downstream portion G12 connected to the outlet O. However, in another embodiment, at least two partition walls 150 may be provided to divide the accommodation space G1 into a plurality of portions, and two or more inlets I and outlets O may be formed such that an inlet I or an outlet O may be provided in each of the portions. In an embodiment, the number of inlets I and the number of outlets O may be different from each other. For example, the numbers of inlets I and outlets O may be adjusted to control the flow resistance or flow rate of the cooling fluid, and to control the flow rate of the cooling fluid by considering the efficiency of cooling according to driving power to prevent or substantially prevent the absence of cooling in a local area.

Referring to FIG. 16, the partition wall 150 may be provided such that the number of battery cells 10 or cell holes 115 defining the assembling positions of battery cells 10 in the upstream portion G11 may be equivalent to the number of battery cells 10 or cell holes 115 in the downstream portion G12 for distributing the burden of heat dissipation uniformly to the cooling fluid in the upstream portion G11 and the downstream portion G12. In an embodiment, for example, the battery cells 10 (or the cell holes 115) may be arranged in eight rows in the extending direction of the partition wall 150, and the partition wall 150 may divide the eight rows into four rows in the upstream portion G11 and four rows in the downstream portion G12. In an embodiment, the number of battery cells 10 in the upstream portion G11 and the number of battery cells 10 in the downstream portion G12 may be equivalent to each other to distribute the heat-dissipating burden of the cooling fluid uniformly or substantially uniformly to the upstream portion G11 and the downstream portion G12.

When the partition wall 150 extends between first and second rows L1 and L2 neighboring each other, the first and second rows L1 and L2 may be arranged adjacent to each other such that cell holes 115 (or battery cells 10) of the first row L1 may be placed between cell holes 115 (or battery cells 10) of the second row L2, and, in this case, the partition wall 150 may extend in a serpentine shape between the first and second rows L1 and L2. For example, the partition wall 150 may extend in a zigzag pattern along outer surfaces of the battery cells 10 of the first and second rows L1 and L2, and, thus, the partition wall 150 may include a plurality of bent portions.

Referring to FIGS. 15 and 16, in an embodiment, the partition wall 150 may include: a wall body portion 155 extending across the accommodation space G1; and first and second coupling portions 151 and 152 coupled to the first and second holder plates 110 and 120 at intermittent positions in a direction from an end side to the other end side. The first and second coupling portions 151 and 152 may be coupled to clearance portions 118 of the first and second holder plates 110 and 120, respectively.

The partition wall 150 may extend along the clearance portions 118 between the cell ribs R, and, in an embodiment, the first and second coupling portions 151 and 152 of the partition wall 150 may be brought into contact with and welded to the clearance portions 118 of the first and second holder plates 110 and 120. The first and second coupling portions 151 and 152 may protrude with a large width in the thickness direction of the wall body portion 155 and may form a wide contact area with the clearance portions 118 of the first and second holder plates 110 and 120. In an embodiment, the first and second coupling portions 151 and 152 may be connected to each other while extending in the height direction of the wall body portion 155.

Each of the clearance portions 118 of the first and second holder plates 110 and 120 may be provided by an extra space among four neighboring cell ribs R having adjacent outer circumferences. For example, the cell ribs R may be densely arranged in such a manner that the outer circumferences of every four cell ribs R which surround the outer circumferences of densely arranged battery cells 10 may be adjacent to each other. In addition, the clearance portions 118, each provided as an extra space among four cell ribs R, may provide coupling positions for fixing the position of the partition wall 150 in the case 100.

Referring to FIG. 15, the wall body portion 155 of the partition wall 150 may have first and second heights h1 and h2 along the partition wall 150. The wall body portion 155 of the partition wall 150 may have the first height h1 over most of the length of the wall body portion 155 from the end side (first short side portion 100S1) in which the inlet I and the outlet O are formed, and may separate the upstream portion G11 and the downstream portion G12 from each other at a position between the first and second holder plates 110 and 120. The wall body portion 155 of the partition wall 150 may have the second height h2 at the other end side (second short side portion 100S2) which is less than the first height h1 at the end side (first short side portion 100S1) so as to form the communication portion CN connecting the upstream portion G11 and the downstream portion G12 to each other at the other end side (second short side portion 100S2) which is opposite the end side in which the inlet I and the outlet O are formed, and the communication portion CN may correspond to the difference between the first height h1 and the second height h2. That is, the wall body portion 155 of the partition wall 150 may be stepped from the first height h1 of the end side to the second height h2 of the other end side, and the communication portion CN may correspond to the difference between the first height h1 and the second height h2.

In an embodiment, the portion having the second height h2 may correspond to a center region of the portion having the first height h1, and, thus, there may be an upper height difference and a lower height difference between the portion having the second height h2 and the portion having the first height h1. In this case, the communication portion CN may include a first communication portion CN1 corresponding to the upper height difference adjacent to the first holder plate 110, and a second communication portion CN2 corresponding to the lower height difference adjacent to the second holder plate 120, and the cooling fluid may smoothly flow between the upstream portion G11 and the downstream portion G12 through the first and second communication portions CN1 and CN2 which are opposite to each other in the height direction of the partition wall 150. For example, the first communication portion CN1 may form a flow of the cooling fluid which makes contact with portions relatively adjacent to the first end portions 11 of the battery cells 10, and the second communication portion CN2 may form a flow of the cooling fluid which makes contact with portions relatively adjacent to the second end portions 12 of the battery cells 10. In an embodiment, due to the first and second communication portions CN1 and CN2, the cooling fluid may flow along portions adjacent to the first and second end portions 11 and 12 at which heating mainly occurs.

As described above, according to one or more embodiments, the cooling fluid may flow in the accommodation space of the battery cells 10 and may directly make contact with the surfaces of the battery cells 10, thereby efficiently dissipating heat from the battery cells 10 by direct convective heat transfer.

In addition, according to one or more embodiments, a sealing structure is provided for the cooling fluid such that the cooling fluid may not leak from the accommodation space G1 of the battery cells 10.

It is to be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
    battery cells, each comprising end portions in a height direction thereof;
    a case accommodating the battery cells and a cooling fluid to cool the battery cells; and
    a first holder plate and a second holder plate which are coupled to the case to face each other along the case such that the end portions of the battery cells are insertable through the first and second holder plates, an accommodation space being defined between the first and second holder plates to accommodate the cooling fluid, the first and second holder plates comprising assembling protrusions protruding outward from the first and second holder plates away from the accommodation space to hold the end portions of the battery cells,
    wherein the case, the battery cells, and the first and second holder plates have heights in the height direction of the battery cells that satisfy the following condition:
    a height between outward-facing surfaces of the first and second holder plates <a height of the battery cells <a height of the case,
    the outward-facing surfaces of the first and second holder plates facing away from each other in the height direction, and the height between the outward-facing surfaces of the first and second holder plates including thicknesses of the first and second holder plates and excluding heights of the assembling protrusions, and
    the battery pack further comprises a potting resin on the outward-facing surfaces of the first and second holder plates and contacting an outer circumferential surface of each of the battery cells between the end portions.

2. The battery pack of claim 1, wherein the potting resin on the first and second holder plates has a height in the height direction that satisfies the following condition:
    the height of the battery cells <the height of the potting resin <the height of the case.

3. The battery pack of claim 2, further comprising a bus bar electrically connecting the battery cells to each other, wherein the potting resin covers coupling portions between the bus bar and the battery cells.

4. The battery pack of claim 3, wherein the bus bar comprises a main body extending along neighboring rows of the battery cells, and branches branching from the main body toward the battery cells, and the coupling portions comprise welded portions between the branches of the bus bar and the battery cells.

5. The battery pack of claim 4, wherein the main body and the branches of the bus bar have a height difference in the height direction, and
    the potting resin covers the branches of the bus bar together with the main body of the bus bar.

6. The battery pack of claim 4, wherein the main body and the branches of the bus bar have a height difference in the height direction, and
    the main body of the bus bar is exposed from the potting resin.

7. The battery pack of claim 1, wherein the potting resin on the first and second holder plates has a height in the height direction that satisfies the following condition:
    the height between the outward-facing surfaces of the first and second holder plates <the height of the potting resin <the height of the battery cells.

8. The battery pack of claim 7, wherein the potting resin exposes vents located at the end portions of the battery cells.

9. The battery pack of claim 1, wherein the case comprises a hollow member which is open in the height direction to accommodate the battery cells and the cooling fluid.

10. The battery pack of claim 9, wherein the case comprises: the accommodation space in a center portion thereof; and outer walls and inner walls extending in parallel to each other along edges of the case around the accommodation space.

11. The battery pack of claim 10, wherein the battery cells, the outer walls, and the inner walls have heights that satisfy the following condition:
    a height of the inner walls <the height of the battery cells <a height of the outer walls.

12. The battery pack of claim 10, wherein well spaces are defined between the outer walls and the inner walls along the edges of the case.

13. The battery pack of claim 12, wherein the potting resin on the first and second holder plates is continuously arranged in the well spaces.

14. The battery pack of claim 12, wherein skirt portions are bent inward from the first and second holder plates toward the well spaces and inserted into the well spaces.

15. The battery pack of claim 14, wherein the skirt portions are bent and extend from the first and second holder plates and surround the inner walls.

16. The battery pack of claim 1, wherein the first and second holder plates comprise cell holes, and the battery cells are inserted into the cell holes, and
    the assembling protrusions are arranged along rows of the cell holes to hold the end portions of the battery cells neighboring each other in a state in which the assembling protrusions are at positions between the cell holes neighboring each other.

17. The battery pack of claim 1, further comprising a bus bar electrically connecting the battery cells to each other,
    wherein some of the assembling protrusions comprise first assembling protrusions which hold the end portions of the battery cells and do not physically interfere with the bus bar, and
    others of the assembling protrusions comprise second assembling protrusions which hold the end portions of the battery cells and the bus bar.

18. The battery pack of claim 17, wherein the first and second assembling protrusions comprise first protrusion portions protruding toward the end portions of the battery cells, and the second assembling protrusions further comprise second protrusion portions protruding toward the bus bar.

19. The battery pack of claim 18, wherein the first protrusion portions are arranged on opposite sides of the second assembling protrusions, and the second protrusion portions are arranged on sides of the second assembling protrusions between the opposite sides.

20. The battery pack of claim 18, wherein the first and second protrusion portions have a height difference in the height direction.

21. The battery pack of claim 1, wherein cell ribs protrude inward from the first and second holder plates toward the accommodation space and surround the outer circumferential surfaces of the battery cells.

22. The battery pack of claim 21, wherein gaps are defined between the outer circumferential surfaces of the battery cells and the cell ribs.

\* \* \* \* \*